United States Patent
Menoher

(10) Patent No.: US 10,966,004 B2
(45) Date of Patent: Mar. 30, 2021

(54) HARDWARE-ENFORCED ONE-WAY INFORMATION FLOW CONTROL DEVICE

(71) Applicant: Jeffrey Charles Menoher, Ridgefield, CT (US)

(72) Inventor: Jeffrey Charles Menoher, Ridgefield, CT (US)

(73) Assignee: Controlled Interfaces, LLC, Ridgefield, CT (US)

( * ) Notice: Subject to any disclaimer, the term of this patent is extended or adjusted under 35 U.S.C. 154(b) by 153 days.

(21) Appl. No.: 16/325,993

(22) PCT Filed: Aug. 21, 2018

(86) PCT No.: PCT/US2018/047230
§ 371 (c)(1),
(2) Date: Feb. 15, 2019

(87) PCT Pub. No.: WO2019/040438
PCT Pub. Date: Feb. 28, 2019

(65) Prior Publication Data
US 2020/0336808 A1    Oct. 22, 2020

Related U.S. Application Data

(60) Provisional application No. 62/548,043, filed on Aug. 21, 2017.

(51) Int. Cl.
*H04Q 11/00* (2006.01)
*H04L 12/66* (2006.01)
(Continued)

(52) U.S. Cl.
CPC ......... *H04Q 11/0005* (2013.01); *H04L 12/66* (2013.01); *H04L 63/10* (2013.01);
(Continued)

(58) Field of Classification Search
CPC ......... H04L 12/66; H04L 63/10; H04L 63/12; H04W 12/06; H04Q 11/0005; H04Q 11/0071; H04Q 2011/0069
See application file for complete search history.

(56) References Cited

U.S. PATENT DOCUMENTS

2005/0270196 A1    12/2005  Madireddy et al.
2009/0154918 A1*    6/2009  Hinderthuer ....... H04Q 11/0005
                                                      398/9
(Continued)

FOREIGN PATENT DOCUMENTS

CN         205017358 U     2/2016

OTHER PUBLICATIONS

International Search Report and Written Opinion of the International Searching Authority Application No. PCT/US2018/047230 Completed: Oct. 25, 2018; dated Nov. 14, 2018 9 Pages.

*Primary Examiner* — Henry Tsai
*Assistant Examiner* — John B Roche
(74) *Attorney, Agent, or Firm* — Whitmyer IP Group LLC

(57) ABSTRACT

An information flow control device has: a first network interface card on a transmission side, the first network interface card including first and second transceivers, each of the first and second transceivers having a transmit port and a receive port; and a second network interface card on a receiving side, the second network interface card including at least one receive port. A first data connection segment connects the first transceiver transmit port to the second transceiver receive port, a second data connection segment connects the second transceiver transmit port to the first transceiver receive port, and a third data connection segment connects the first transceiver transmit port to the receive port of the second network interface card. Interconnection of the first and second transceivers provides continuity while connection of the first transceiver transmit port and the receive (Continued)

port of the second network interface card enables hardware-enforced one-way data transfer.

46 Claims, 25 Drawing Sheets

(51) Int. Cl.
  *H04L 29/06* (2006.01)
  *H04W 12/06* (2021.01)
(52) U.S. Cl.
  CPC ......... *H04L 63/12* (2013.01); *H04Q 11/0071* (2013.01); *H04W 12/06* (2013.01); *H04Q 2011/0069* (2013.01)

(56) References Cited

U.S. PATENT DOCUMENTS

| | | |
|---|---|---|
| 2010/0235561 A1 | 9/2010 | Goldring |
| 2010/0257353 A1 | 10/2010 | Cheng |
| 2012/0017079 A1 | 1/2012 | Mraz et al. |
| 2012/0042357 A1 | 2/2012 | Mraz |
| 2012/0269509 A1* | 10/2012 | Hultermans ..... H04B 10/25756 398/43 |
| 2014/0208420 A1 | 7/2014 | Mraz et al. |
| 2016/0261561 A1 | 9/2016 | Kim et al. |

* cited by examiner

HARDWARE-ENFORCED ONE-WAY INFORMATION FLOW CONTROL DEVICE

BACKGROUND OF THE DISCLOSURE

1. Field of the Disclosure

The present disclosure relates to a system and a method for implementing one-way information flow control, and relates more particularly to implementation of one-way information flow control using a hardware system including a pair of optical network interface cards linked by at least one split optical fiber connection.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

When information must be transferred between isolated networks of differing confidentiality or integrity, existing information security models (e.g., Bell-LaPadula and Biba) favor implementation of one-way information flow controls. Examples include: (i) ingest of business intelligence and military intelligence information into confidential networks where backward flow is considered breach of secrecy; and (ii) release of real-time state information from a high-integrity Industrial Control System (ICS) networks for purposes of remote monitoring where ingress of malicious software could disable operations. Examples of the latter include Industrial Control System (ICS) networks in nuclear power plants.

Information flow control may be implemented in software or hardware. However, software is known to be vulnerable to various forms of software attack, which makes hardware-enforced flow control more attractive because unauthorized reconfiguration of the security device cannot be achieved without physical access to the device.

For some high-impact sectors of the US designated as "critical infrastructure" and defined accordingly by the Department of Homeland Security, implementation of hardware-enforced, one-way information flow control devices to protect critical networks are now required by law. One example of "critical infrastructure" sector is the US nuclear industry.

The US National Institute of Standards and Technology (NIST) defines an explicit security control (information security risk mitigation method) in NIST's Special Publication (SP) 800-53, "Catalog of Security Controls for Federal Information Processing Systems," AC-4 (7), INFORMATION FLOW ENFORCEMENT|ONE-WAY FLOW MECHANISMS: "The information system enforces [Assignment: organization-defined one-way information flows] using hardware mechanisms."

Historically, one-way information flow control devices, also known as "data diodes," have been unreliable, slow, difficult to configure (and thus prone to user error), and/or very expensive, and few vendors offer one-way information flow control products. The majority of one-way information flow control products were implemented in software, typically by implementing network access restrictions in commercial firewalls from vendors such as Cisco™ and Sidewinder™. Some specialty one-way information flow control devices, e.g., those produced by Tresys™ implement software that is secured using SE Linux security policies. However, even those software products implementing rigorous security enhancements are known to be vulnerable to a broad variety of software attack methods.

Hardware-enforced one-way information flow control devices are more secure than software-based products because the hardware-enforced configuration cannot be altered by software attack, and their inherent security cannot be breached without physical access. However, conventional hardware-enforced one-way flow control has proven to be problematic for a variety of reasons. One problem has been very slow speed, e.g., as implemented in RS-232 cables with one wire clipped. The US Naval Research Laboratory produced a data diode called the Network Pump that is known to be very slow and is not purely one-way in its information flow. The Network Pump presents a reverse information flow acknowledgement of limited bandwidth. Another problem has been unreliable performance, e.g., as implemented with dubious protocol compromises or with many critical components whose combined MTBF (mean time between failure) results in short overall lifespan. Yet another problem has been the high cost, e.g., as implemented using ATM IC (asynchronous transfer mode integrated circuit) components or custom FPGA (field-programmable gate array) devices by Owl Computing Technologies™.

Therefore, there exists a need for an improved hardware-enforced one-way information flow control device.

SUMMARY

The present disclosure is directed to implementing one-way information flow control using a hardware-enforced one-way information flow control device or system.

Information flows from an information-source computer platform into the hardware-enforced one-way information flow control device or system of the present disclosure through a standard network socket interface software. Subsequently, the information is routed within the transmission side of the one-way information flow control device through a proprietary software interface to an opto-electronic hardware in the transmission side, followed by transmission via an optical physical transmission medium to an opto-electronic hardware on the receiving side of the one-way information flow control device or system. The information is routed within the receiving side from the opto-electronic hardware through a proprietary software interface, followed by outward flow of information from the receiving side of the one-way information flow control device or system through standard network socket interface software.

Specific examples of information flow that may benefit from the hardware-enforced one-way information flow control device or system of the present disclosure include security video camera information feeds (e.g., Moving Picture Experts Group transport stream (MPEG-TS)), audio communications (MPEG audio), inter-computer error alert messages (e.g., Simple Network Management Protocol (SNMP) and Syslog (message logging standard) messages). These information flows may be rendered, e.g., as streams of User Datagram Protocol (UDP) Datagrams that travel across networks with minimal latency. No feedback or acknowledgement is required. UDP multicasting may be used in Industrial Control System (ICS) network for implicit messages that are most critical and for real-time communications. UDP Datagrams may also be used to transmit real-time state information relating to physical objects, e.g., pumps, furnaces, and generators. Information from such computer controlled physical objects may include temperature, pressure, alarms, and alerts as implemented in nuclear power plants. Nuclear Regulatory Commission Guidance document NRG 5.71 mandates use of one-way information flow control devices to protect the innermost (i.e., highest impact) Critical Cyber Assets in nuclear ICS networks. As illustrated in detail in FIG. 2, which shows layered network security in nuclear power plants mandated by the U.S. Nuclear Regulatory Commission Guidance NRG 5.71, physical Critical Cyber Assets are located on the NRC Level 4 ICS Network, and may be monitored from external network locations anywhere.

In an example embodiment, the one-way information flow control device or system may include: (i) a pair of optical network interface cards (a sending network interface card (SNIC) and a receiving network interface card (RNIC)), which are connected by at least one Y-configuration split optical fiber and a standard optical fiber; and (ii) software integrated to transfer data in one-direction from the SNIC to the RNIC without any backward flow of information, without any electrically conductive connection, and without the use of a routable communication protocol. SNIC and RNIC are typically installed in physically separate computer platforms. In other embodiments, one or both of the SNIC and RNIC may be connected to computer platforms. Instead of optical fibers, the one-way information flow control device or system may be configured such that Ethernet cables or other transmission cables connect the SNIC to the RNIC. Attentively, the SNIC and RNIC may be connected wirelessly.

In an example embodiment, the SNIC may include two bi-directional optical transceivers and the RNIC may include one bi-directional optical transceiver. In another example embodiment, the SNIC may include two bi-directional optical transceivers and the RNIC may include two bi-directional optical transceivers.

In another example embodiment, when the sending network interface card (SNIC) and two receiving network interface cards (RNICs) are installed in physically separate computing platforms, the one-way information flow control device or system according to the present disclosure permits one computing platform to send information to the two other computing platforms while not permitting any information to flow in the reverse direction and while all computing platforms remain electrically isolated from each other. In other embodiments, one or more of the SNIC and the two RNICs may be connected to computer platforms. For example, the two RNICs may be connected to the same computer platform or to separate computer platforms.

The hardware-enforced one-way information flow control device or system according to the present disclosure provides numerous desirable features and advantages: high data transfer throughput; low data transfer latency; inherent simplicity that does not rely on custom IC (integrated circuit) hardware or FPGA (field-programmable gate array) devices; inherent reliability resulting from simplicity; multiple independent streams of information may flow through the device concurrently; and standard socket interfaces may be used to pass information to and from the device.

BRIEF DESCRIPTION OF THE DRAWINGS

A component or a feature that is common to more than one drawing is indicated with the same reference number in each of the drawings.

DESCRIPTION OF THE DISCLOSURE

Figure 1:
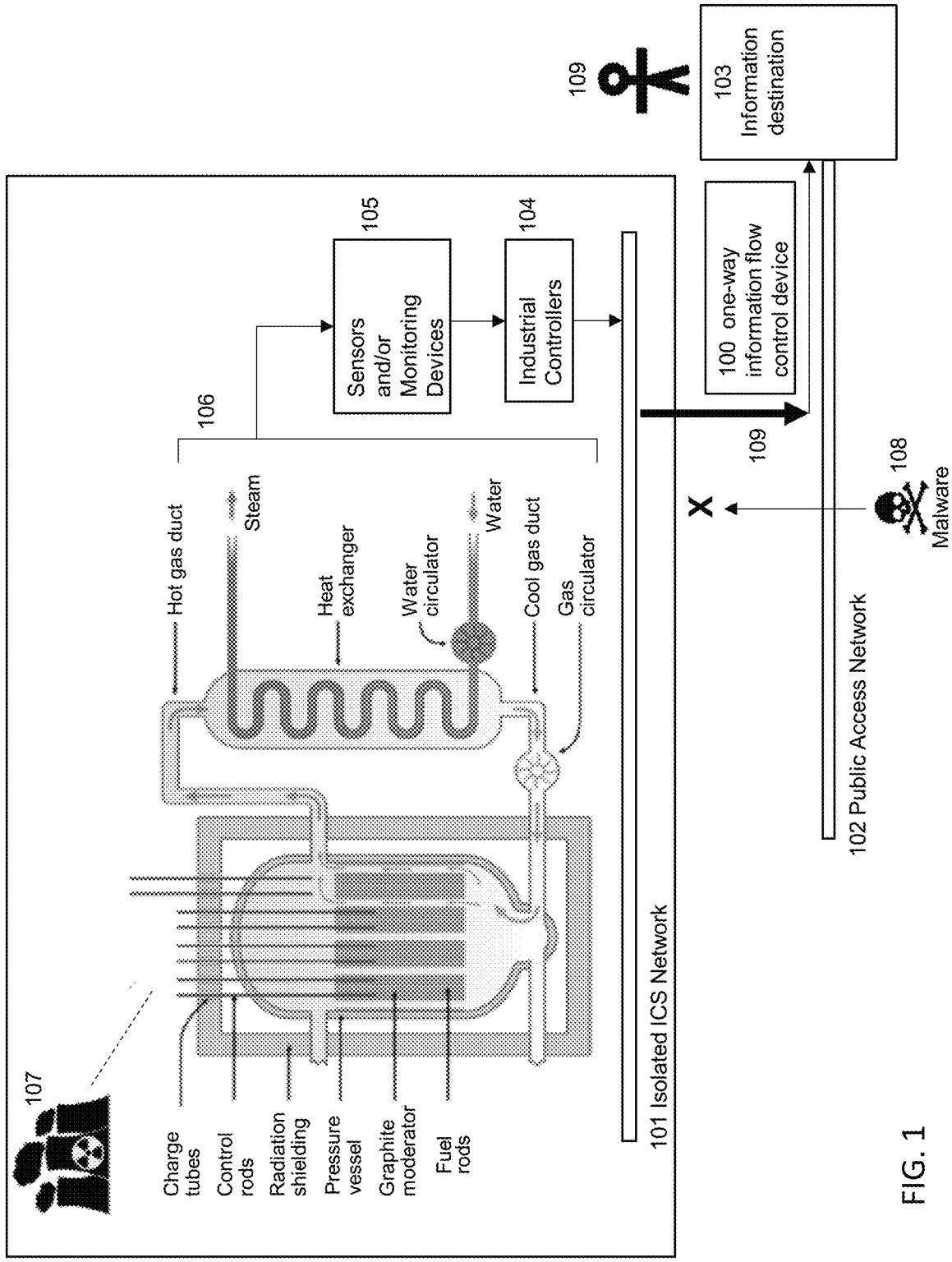
FIGS. 1-19 illustrate various example embodiments and techniques according to the present disclosure.

FIG. 1 shows an illustrative example of a one-way information flow pipeline implemented with a hardware-enforced one-way information flow control device or system 100 which facilitates a one-way flow of information (represented by arrow 109) between an isolated Industrial Control System (ICS) network 101 and a public access network 102, which public access network 102 in turn provides the information to an information destination 103. One-way information flow prevents malware from entering the ICS network 101 and permits remote monitoring at the information destination 103 while maintaining network isolation of the ICS network 101. In the example shown in FIG. 1, the ICS network 101 includes, e.g., information sources 106 of a nuclear reactor system 107, sensors and/or monitoring device 105, and industrial controllers 104. Information sources 106 may include, e.g., components of reactor vessels, pumps, valves, and turbines. Sensors and monitoring devices 105 obtain real-time data (e.g., pressure, temperature, turbine speed, etc.) from the information sources 106 and transmit the real-time data to the industrial controllers 104 for processing and further action. The real-time data from industrial controllers 104 of the isolated ICS network 101 may be provided to the information destination 103 in a one-way information flow 109 via the hardware-enforced one-way information flow control device or system 100, thereby enabling personnel at the information destination 103 (which may be, e.g., a remote management site) to have detailed, real-time information regarding the nuclear reactor system 107.

Figure 2:
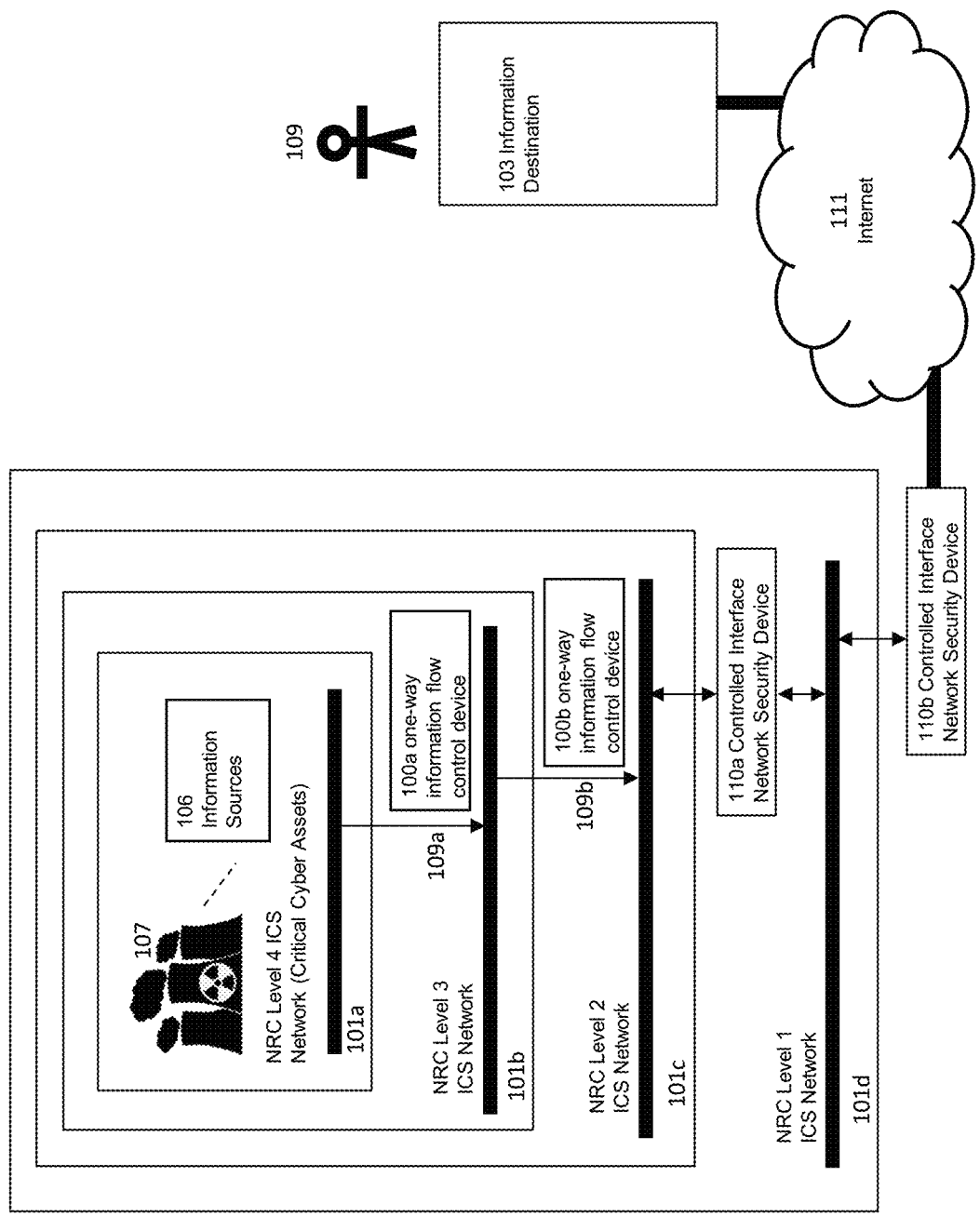

FIG. 2 shows an illustrative example of an information security environment mandated by regulatory guidelines, which information security environment may be achieved with the aid of a hardware-enforced one-way information flow control device or system according to the present disclosure. More specifically, FIG. 2 shows layered network security in nuclear power plants mandated by the U.S. Nuclear Regulatory Commission Guidance NRG 5.71, according to which regulatory framework four separate levels of ICS networks are provided. Information sources 106 of a nuclear reactor system 107 are provided within NRC Level 4 ICS network 101a, and mandated one-way information flow 109a from NRC Level 4 ICS network 101a to NRC Level 3 ICS network 101b may be enforced by a one-way information flow control device 100a. Similarly, mandated one-way information flow from NRC Level 3 ICS network 101b to NRC Level 2 ICS network 101c may be enforced by a one-way information flow control device 100b. Information flow between NRC Level 2 ICS network 101c and NRC Level 1 ICS network 101d may be bi-directional information flow via controlled interface network security device 110a. In addition, bi-directional information flow between NRC Level 1 ICS network 101d and information destination 103 (e.g., a remote management site) staffed by personnel 109 may be achieved via controlled interface network security device 110b and Internet 111.

Figure 3:
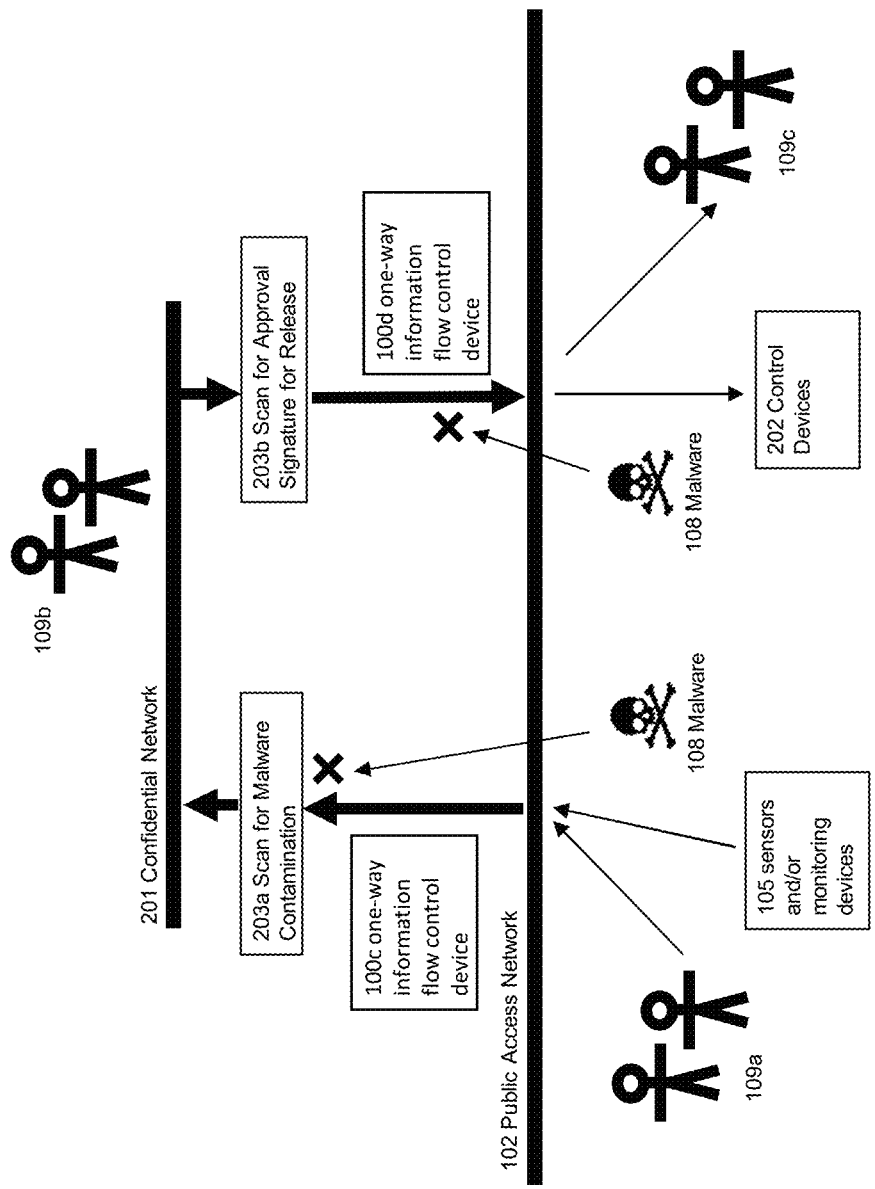

FIG. 3 shows an illustrative example of an information security environment implementing information confidentiality flow policy restrictions, which information security environment may be achieved with the aid of a hardware-enforced one-way information flow control device or system according to the present disclosure. Some examples of information confidentiality flow policy restrictions include restrictions related to military operations, civilian emergency response operations, and some business operations. For implementing information confidentiality flow policy restrictions between a low-confidentiality domain (e.g., the domain of public access network 102) and a high-confidentiality domain (e.g., the domain of confidential network 201), separate one-way information flow control devices 100c and 100d may be utilized.

Information gathered by sensors and/or monitoring devices 105 and/or information from researchers, data gatherers and/or witnesses 109a, may be sent from the domain of public access network 102 to the domain of confidential network 201 (which is accessible by personnel 109b such as executives, commanders, and decision makers are present) via a one-way information flow control device 100c, with a scan 203a for malware contamination being performed so as to prevent any malware 108 entering the confidential network 201. The scan 203a for malware contamination maintains integrity of information in the domain of confidential network 301. The scan 203a may be performed by the one-way information flow control device 100c or by a separate scanning device.

Information from the confidential network 201, e.g., information released by personnel 109b such as executives, commanders, decision makers, etc., is subjected to scan 203b for approval signature for release, and if the approval signature for release is present, transmitted via the one-way information flow control device 100d to the domain of the public access network 102, within which the transmitted information may be delivered to the control devices 202 and/or recipients 109c, e.g., troops, emergency response personnel, and field personnel. The scan 203b for approval signature for release prevents unintentional disclosure of restricted information. Furthermore, the one-way information flow control device 100d prevents any malware 108 from entering the confidential network 201 from the public access network 102.

Figure 4A:
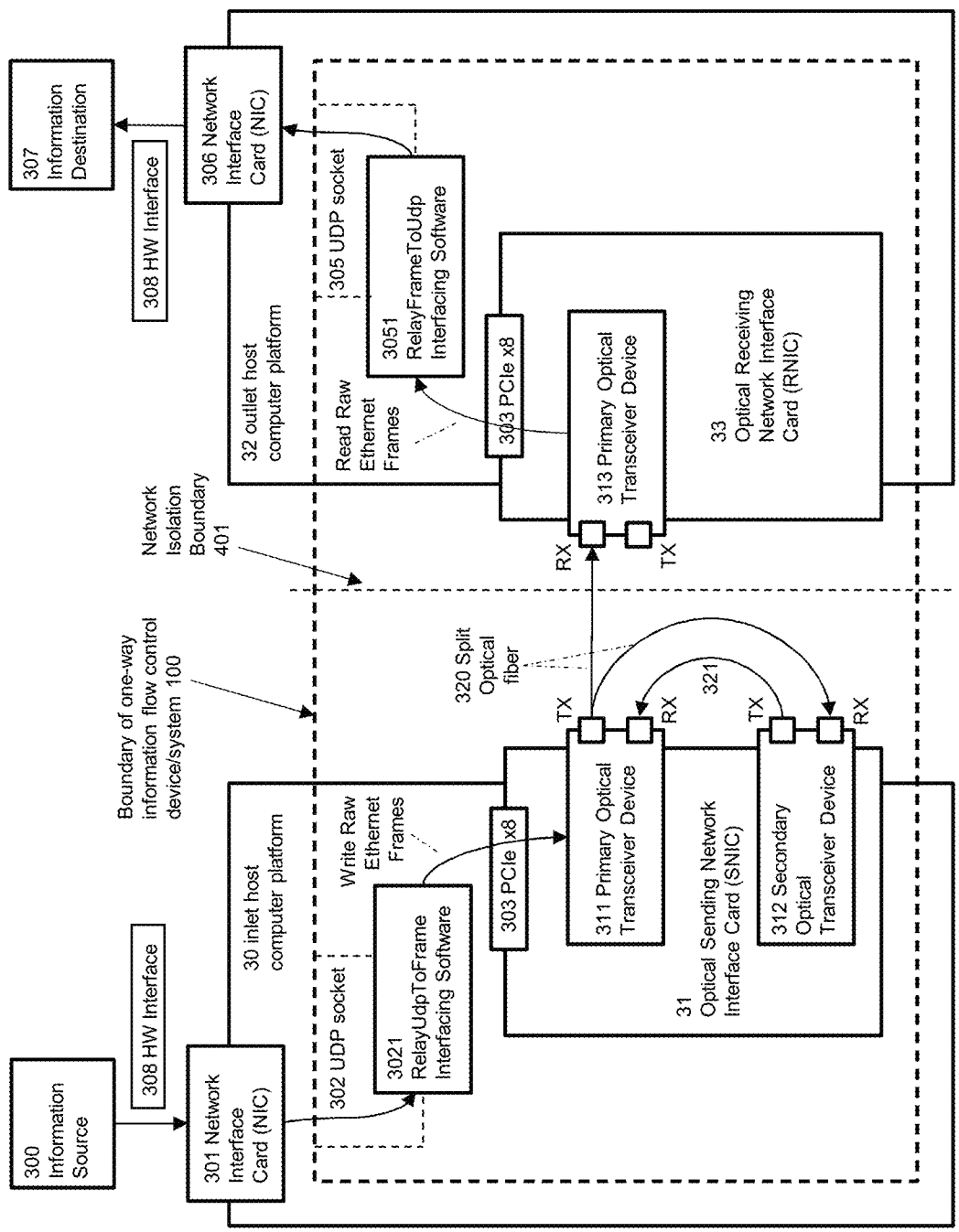

FIG. 4A shows example hardware and software components of an illustrative example embodiment of a hardware-enforced one-way information flow control device or system 100, the boundary of which device or system 100 is shown by the dashed line. Information flows from an information source 300, e.g., a computer platform, through a standard network interface (e.g., hardware (HW) interface 308, which may be RJ45 interface, and network interface card (NIC) 301) into inlet host computer platform 30, to which the "sending" side of the hardware-enforced one-way information flow control device or system 100 is linked. A proprietary software interface 3021 (designated herein as "Relay UDP to Frame Interfacing Software" in FIG. 4A, but also referred to as "SNIC Interfacing Software" in the present disclosure) opens a raw output (sending) socket that binds to an optical sending network interface card (SNIC) 31 within the "sending" side of the one-way information flow control device or system 100. The SNIC 31 may be, e.g., a 10G (gigabit) SNIC. The software interface 3021 receives information from the inlet host computer platform 30 via a standard UDP Datagram receiving socket 302 and/or other standard programming interface methods such as file resource access (the example embodiment of the one-way information flow control device or system 100 is not limited to these interface methods which are merely examples, and hence UDP and file resource access may be seen as examples of more general "data outlet interface"), and routes the information within the "sending" side of the one-way information flow control device or system 100 to a primary optical transceiver device 311 of an optical sending network interface card (SNIC) 31 which utilizes, e.g., PCIe (peripheral component interconnect express) expansion bus standard shown as box 303 in FIG. 4A. As is widely understood by one of ordinary skill in the art, a "socket" as used in the present disclosure (e.g., UDP sockets 302 and 305) refers to a software element in networking software (e.g., protocol stack), which "socket" represents an internal endpoint for sending or receiving data at a single node in a computer network. The information is transmitted from the primary optical transceiver device 311 of the SNIC 31 to a primary optical transceiver device 313 of an optical receiving network interface card (RNIC) 33 on the "receiving" side of the hardware-enforced one-way information flow control device or system 100 via a fiber-optic connection arrangement which is described in further detail below.

Within the receiving side of the hardware-enforced one-way information flow control device or system 100, a proprietary software interface 3051 (designated as "Relay Frame to UDP Interfacing Software" in FIG. 4A, but also referred to as "RNIC Interfacing Software" in the present disclosure) opens a raw receiving (input) socket that binds to an optical receiving network interface card (RNIC) 33. The RNIC 33 may be, e.g., a 10G (gigabit) RNIC. The software interface 3051 routes the information from the primary optical transceiver device 313 of the RNIC 33 which utilizes, e.g., PCIe (peripheral component interconnect express) expansion bus standard shown as box 303 in FIG. 4A, to a network interface card (NIC) 306 via a UDP Datagram sending socket 305 and/or other standard programming interface methods such as file resource access. The information is routed from the NIC 306 to the information destination 307 (e.g., a computer platform) through a standard network interface hardware, e.g., hardware (HW) interface 308, which may be RJ45 interface.

The fiber-optic connection linking various parts of the SNIC 31 and the RNIC 33 shown in FIG. 4A is described in further detail here. The SNIC 31 provides two bi-directional optical interfaces: primary optical transceiver device 311; and secondary optical transceiver device 312. Primary optical transceiver device 311 and secondary optical transceiver device 312 each include an optical emitter port (TX) and an optical detector (receiver) port (RX). A split optical fiber 320 (e.g., Lucent™ connector (LC) type) having a Y-shape is provided, with the fused end of the split optical fiber 320 (the trunk of the Y) inserted into the TX port of the SNIC primary optical transceiver device 311. One of the remaining ends of the split optical fiber 320 is inserted into the RX port of the SNIC secondary optical transceiver device 312. The remaining end of the split optical fiber 320 is inserted into the RX port of the primary optical transceiver device 313 in the RNIC 33. A standard optical fiber 321 connects the TX port of the SNIC secondary optical transceiver device 312 to the RX port of the SNIC primary optical transceiver device 311. The fiber-optic connection between the primary and secondary optical transceiver devices 311 and 312 provided by the optical fibers 320 and 321 permits the primary and secondary optical transceiver devices 311 and 312 to sense a datalink connection. The TX port of the RNIC primary optical transceiver device 313 is disabled or plugged, e.g., with optically opaque material. In some embodiments, the primary optical transceiver device 313 in the RNIC 33 has an RX port only, i.e., it does not have a TX port. The fiber-optic connection arrangement provided by the optical fiber 320 between the primary optical transceiver device 311 of SNIC 31 and the primary optical transceiver device 313 of RNIC 33 permits the RNIC 33 to sense a datalink connection, but the RNIC 33 cannot transmit any information due to the plugging of the TX port of the primary optical transceiver device 313, and therefore the RNIC 33 functions as an optical tap that only receives information in a one-way information transfer across the network isolation boundary 401 shown in FIG. 4A, i.e., via the portion of the optical fiber 320 linking the TX port of the primary optical transceiver device 311 in the SNIC 31 to the RX port of the primary optical transceiver device 313 in the RNIC 33.

In some embodiments, a single connector provides for both the emitter port (TX) and the receiver port (RX). In other embodiments, the emitter port (TX) and the receiver port (RX) are provided by two separate connectors in the transceiver. Although the one-way information flow control device or system 100 is described above as comprising optical network interface cards, it may be configured to have Ethernet cards, wireless cards, modem cards, or other types of network interface cards. Furthermore, the one-way information flow control device or system may utilize different types of network interface cards in order to provide the connections between the transmission side and the receiving side.

A brief discussion of commercial off-the-shelf (COTS) network interface cards (NICs) operation is provided here to explain the interaction between SNIC 31 and RNIC 33. COTS NICs present specific hardware features that indicate certain conditions, e.g., LED link light, which indicates whether a network connection exists between the NIC and the network. For example, an unlit LED link light is an indication that something is awry with the network cable or connection. NIC hardware will not send information on command if a valid network link is not detected (which network link detection requires a certain amount of information to be received by the NIC), and network link connectivity to be detected by NIC hardware cannot be configured in software.

For the foregoing reason, in the one-way information flow control device or system 100 according to the present disclosure, the secondary send-side transceiver (e.g., transceiver device 312 in FIG. 4A) is provided to generate a network link that results in an indication of message traffic to the primary send-side transceiver (e.g., transceiver device 311 in FIG. 4A). Using the split optical fiber 320, the primary send-side transceiver (e.g., transceiver device 311 in FIG. 4A) also sends enough information for the primary receive-side transceiver (e.g., transceiver device 313) to detect a valid network link. When the secondary send-side transceiver (e.g., transceiver device 312 in FIG. 4A) is connected to enable bi-directional communication with the primary send-side transceiver (e.g., transceiver device 311 in FIG. 4A), the primary send-side transceiver detects a valid network link, and the primary send-side transceiver will send information on command when the valid network link is detected. When information is sent from the primary send-side transceiver (e.g., transceiver device 311 in FIG. 4A), it is sent to two destinations through the split optical fiber (e.g., optical fiber 320): the secondary send-side transceiver (e.g., transceiver device 312) and the primary receive-side transceiver (e.g., transceiver device 313). Since the information sent by the primary send-side transceiver (e.g., transceiver device 311 in FIG. 4A) in the one-way information flow control device or system 100 according to the present disclosure is, by design, specifically addressed (e.g., using MAC (media access control) address) to the primary receive-side transceiver (e.g., transceiver device 313), the sent information is ignored by the secondary send-side transceiver (e.g., transceiver device 312).

Figure 4B:
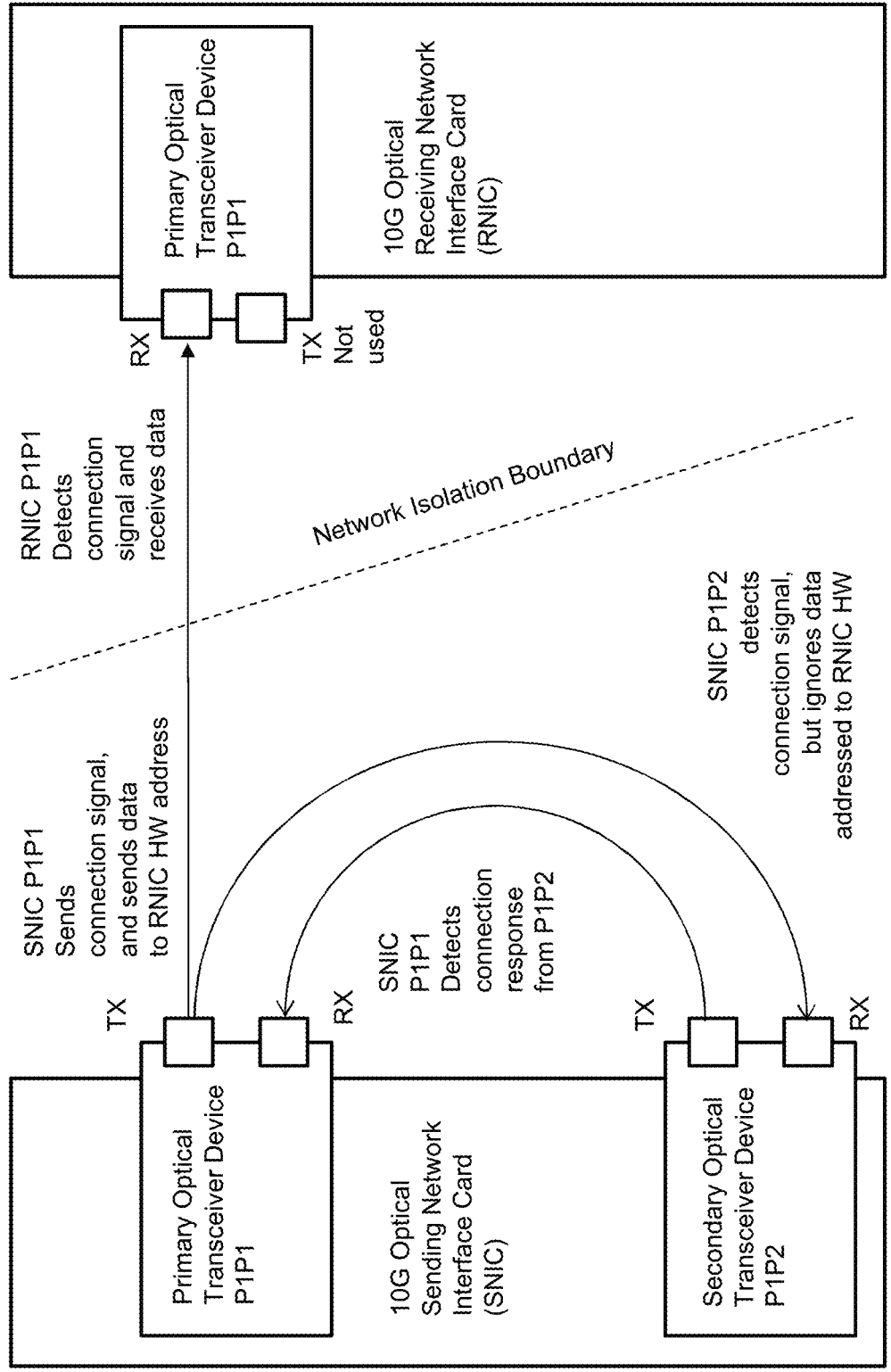

FIG. 4B shows illustrates the core concept of how a pair of standard hardware-implemented two-way communication optical network interface cards are transformed into a specialized hardware-enforced one-way information flow control device by connecting the optical network interface cards using a split optical fiber arrangement.

Figure 5A:
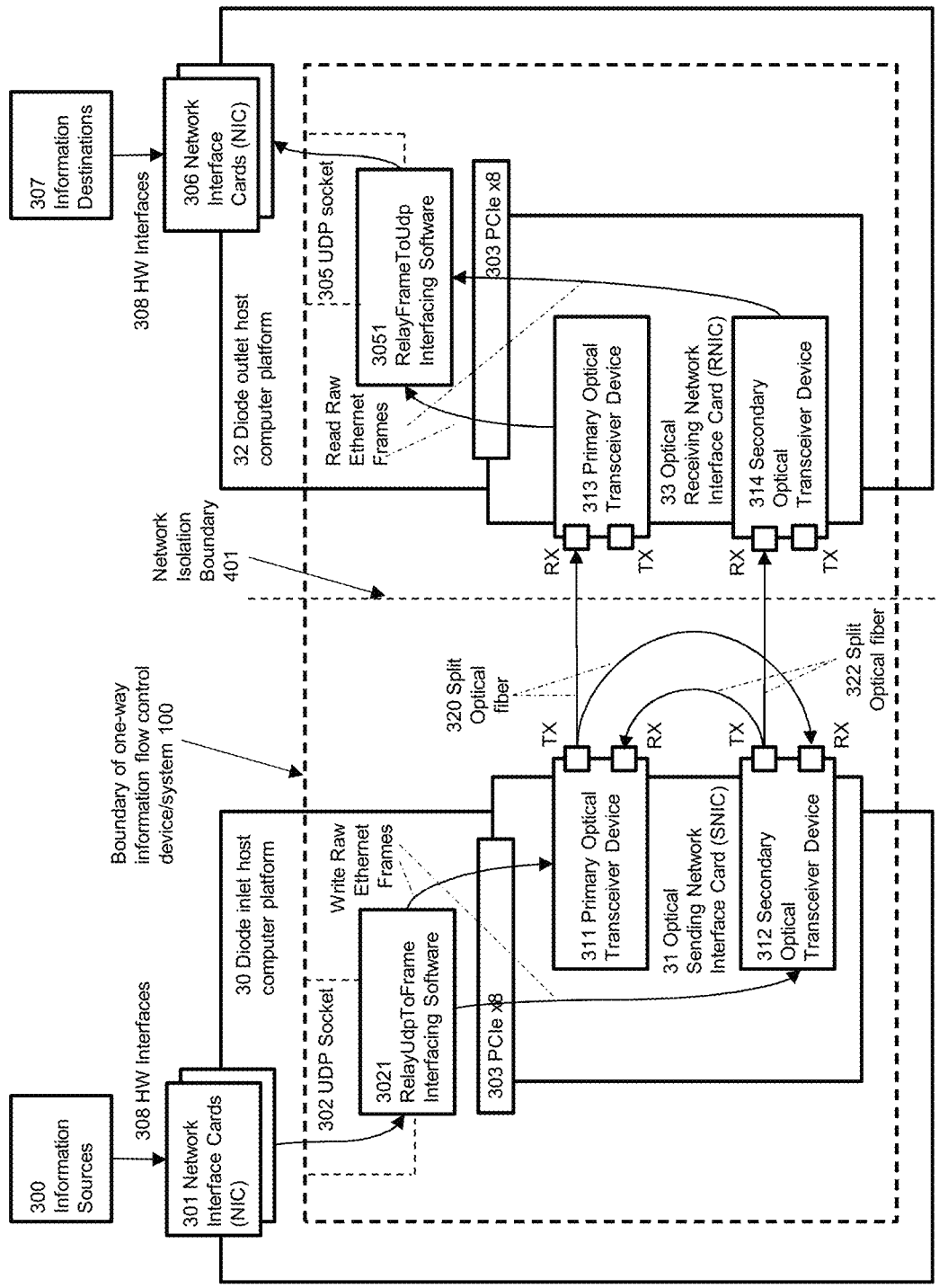

FIG. 5A shows example hardware and software components of another illustrative example embodiment of a hardware-enforced one-way information flow control device or system 100, the boundary of which device or system 100 is shown by the dashed line. The example embodiment shown in FIG. 5A is substantially similar to the example embodiment shown in FIG. 4A, with the following differences: (i) in FIG. 5A, multiple network interface cards (NIC) 301 are provided in each of the inlet host computer platform 30 and outlet host computer platform 32; (ii) in FIG. 5A, a secondary optical transceiver device 314 is additionally provided in the RNIC 33; and (iii) instead of the connection provided by the optical fiber 321 in FIG. 4A, a split optical fiber 322 (e.g., Lucent™ connector (LC) type) having a Y-shape is provided. The software interface 3021 receives information from the inlet host computer platform 30 via a standard UDP Datagram receiving socket 302 and/or other standard programming interface methods such as file resource access, and routes the information within the "sending" side of the one-way information flow control device or system 100 to the primary optical transceiver device 311 and the secondary optical transceiver device 312 of the SNIC 31. The information is transmitted from the primary and secondary optical transceiver devices 311 and 312 of the SNIC 31 to the primary and secondary optical transceiver devices 313 and 314 of the RNIC 33, respectively, via a fiber-optic connection arrangement which is described in further detail below. Within the receiving side of the hardware-enforced one-way information flow control device or system 100, the software interface 3051 routes the information from the primary and secondary optical transceiver devices 313 and 314 of the RNIC 33 to a network interface card (NIC) 306 via a UDP Datagram sending socket 305 and/or other standard programming interface methods such as file resource access. The information is routed from the NIC 306 to the information destination 307 (e.g., a computer platform) through a standard network interface hardware, e.g., hardware (HW) interface 308, which may be RJ45 interface.

The fiber-optic connection linking various parts of the SNIC 31 and the RNIC 33 shown in FIG. 5A is described in further detail here. The fiber-optic connection among the transceiver devices 311, 312 and 313 using the split optical fiber 320 in FIG. 5A corresponds to the connection shown in FIG. 4A. In addition, a split optical fiber 322 (e.g., Lucent™ connector (LC) type) having a Y-shape is provided, with the fused end of the split optical fiber 322 (the trunk of the Y) inserted into the TX port of the SNIC secondary optical transceiver device 312. One of the remaining ends of the split optical fiber 322 is inserted into the RX port of the SNIC primary optical transceiver device 311. The remaining end of the split optical fiber 322 is inserted into the RX port of the secondary optical transceiver device 314 in the RNIC 33. The TX ports of the RNIC primary and secondary optical transceiver devices 313 and 314 are plugged, e.g., with optically opaque material. The fiber-optic connection arrangement provided by the portion of the optical fiber 320 between the primary optical transceiver device 311 of SNIC 31 and the primary optical transceiver device 313 of RNIC 33 permits the transceiver device 313 of the RNIC 33 to sense a datalink connection, but the transceiver device 313 of the RNIC 33 cannot transmit any information due to the plugging of the TX port of the transceiver device 313. Similarly, the fiber-optic connection arrangement provided by the portion of the optical fiber 322 between the secondary optical transceiver device 312 of SNIC 31 and the secondary optical transceiver device 314 of RNIC 33 permits the transceiver device 314 of the RNIC 33 to sense a datalink connection, but the transceiver device 314 of the RNIC 33 cannot transmit any information due to the plugging of the TX port of the transceiver device 314. In this manner, the RNIC 33 functions as an optical tap that only receives information in a one-way information transfer across the network isolation boundary 401 shown in FIG. 5A, i.e., via the portions of the optical fibers 320 and 322 linking the TX ports of the primary and secondary optical transceiver devices 311 and 312 in the SNIC 31 to the RX ports of the primary and secondary optical transceiver devices 313 and 314 in the RNIC 33, respectively.

Figure 5B:
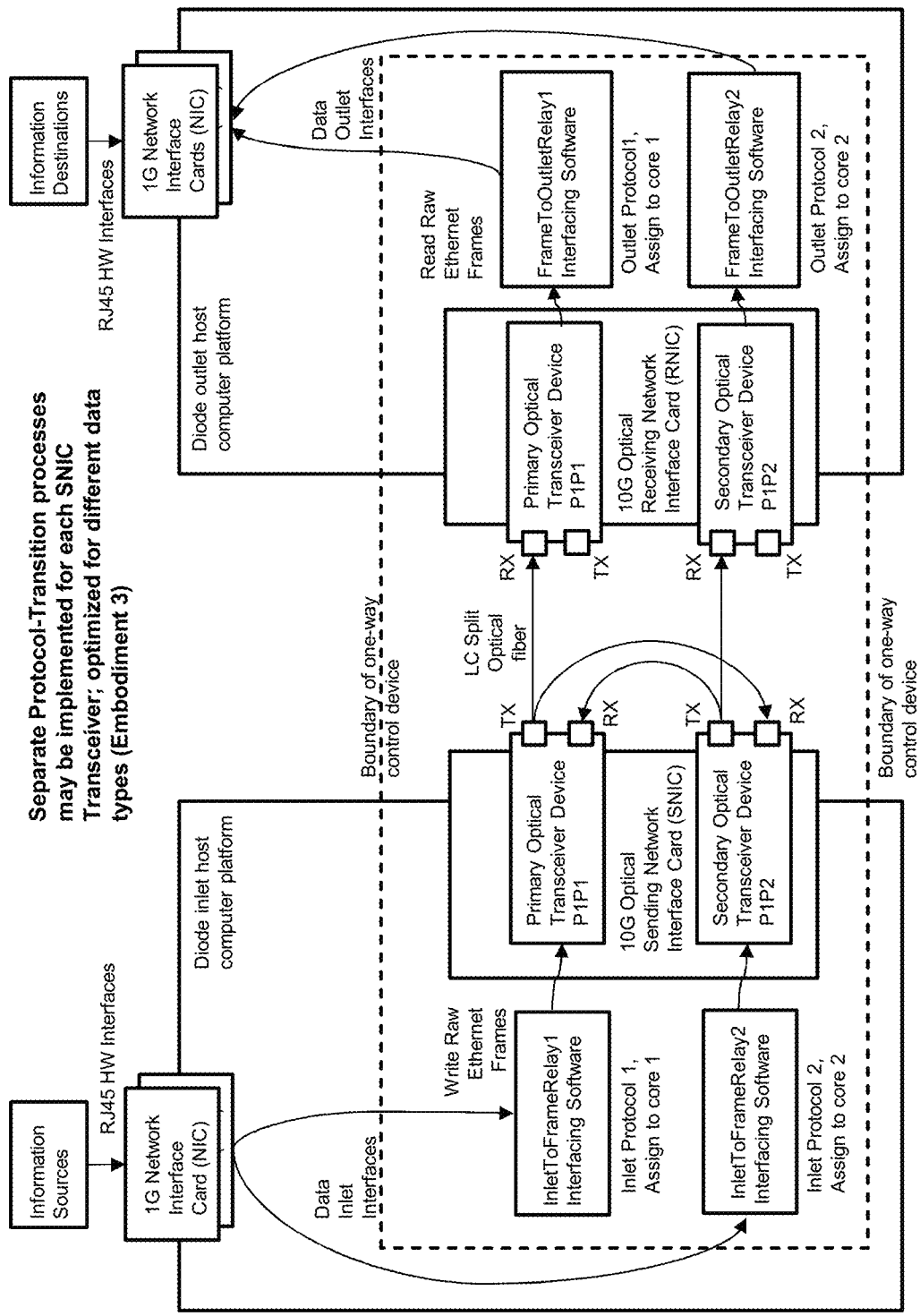

FIG. 5B shows example hardware and software components of another illustrative example embodiment of a hardware-enforced one-way information flow control device or system 100, the boundary of which device or system 100 is shown by the dashed line. The example embodiment shown in FIG. 5B is substantially similar to the example embodiment shown in FIG. 5A, with the difference that the embodiment of FIG. 5B comprises an independent proprietary software module driving each optical transceiver in the SNIC and in the RNIC. In the example embodiment of FIG. 5B, the independent software modules may be optimized for different IP protocols (e.g., UDP and TCP), may be prioritized at different levels by the host operating system, and may be assigned to different CPU cores for accelerated (e.g., parallel) processing. In the example shown in FIG. 5B, the P1P1 transceiver driver module may be configured, e.g., to receive UDP packets, which requires high prioritization in order to prevent UDP packets from being dropped at the receiving socket (because delivery of UDP packet transfer is session-less and delivery of the UDP packets is not assured by the protocol specification). The P1P2 transceiver driver module may be configured, e.g., for TCP sessions, and may run at much lower priority in the host operating system (because the TCP protocol is session-based and delivery of TCP packets is assured by the protocol specification). Running two concurrent software processes at different priority levels assures that the UDP packets will be captured and processed with high priority (protecting against packet loss) while concurrently assuring that TCP sessions (which may be encrypted and may significantly load the CPU) operate in the background self-modulating their information transfer rates at lower priority without data loss.

Figure 5C:
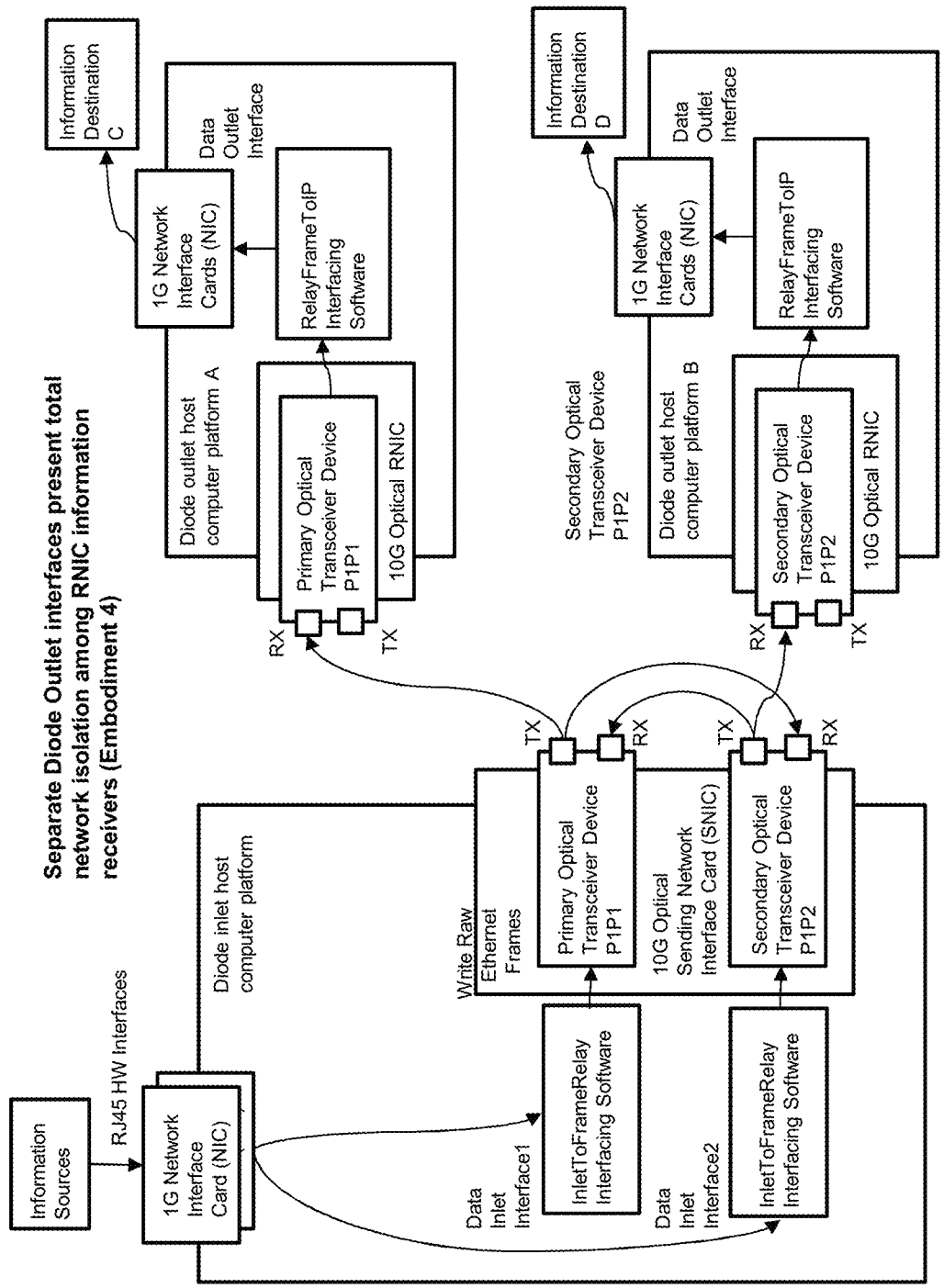

FIG. 5C shows example hardware and software components of another illustrative example embodiment of a hardware-enforced one-way information flow control device or system 100, the boundary of which device or system 100 is shown by the dashed line. The example embodiment shown in FIG. 5C is substantially similar to the example embodiment shown in FIG. 5B, with the difference that in the embodiment of FIG. 5C, the two optical fiber connections from a single SNIC are connected to two different outlet computer platforms, e.g., platform A and platform B, each equipped with an RNIC but otherwise isolated from each other. Due to the one-way information flow into each RNIC, the two RNIC host computer platforms A and B present total network isolation from each other. This configuration solves a significant problem in Cross Domain connectivity, i.e., it is sometimes desirable to connect a single source to multiple recipient destinations while ensuring that the recipient destinations cannot communicate with one-another.

Figure 5D:
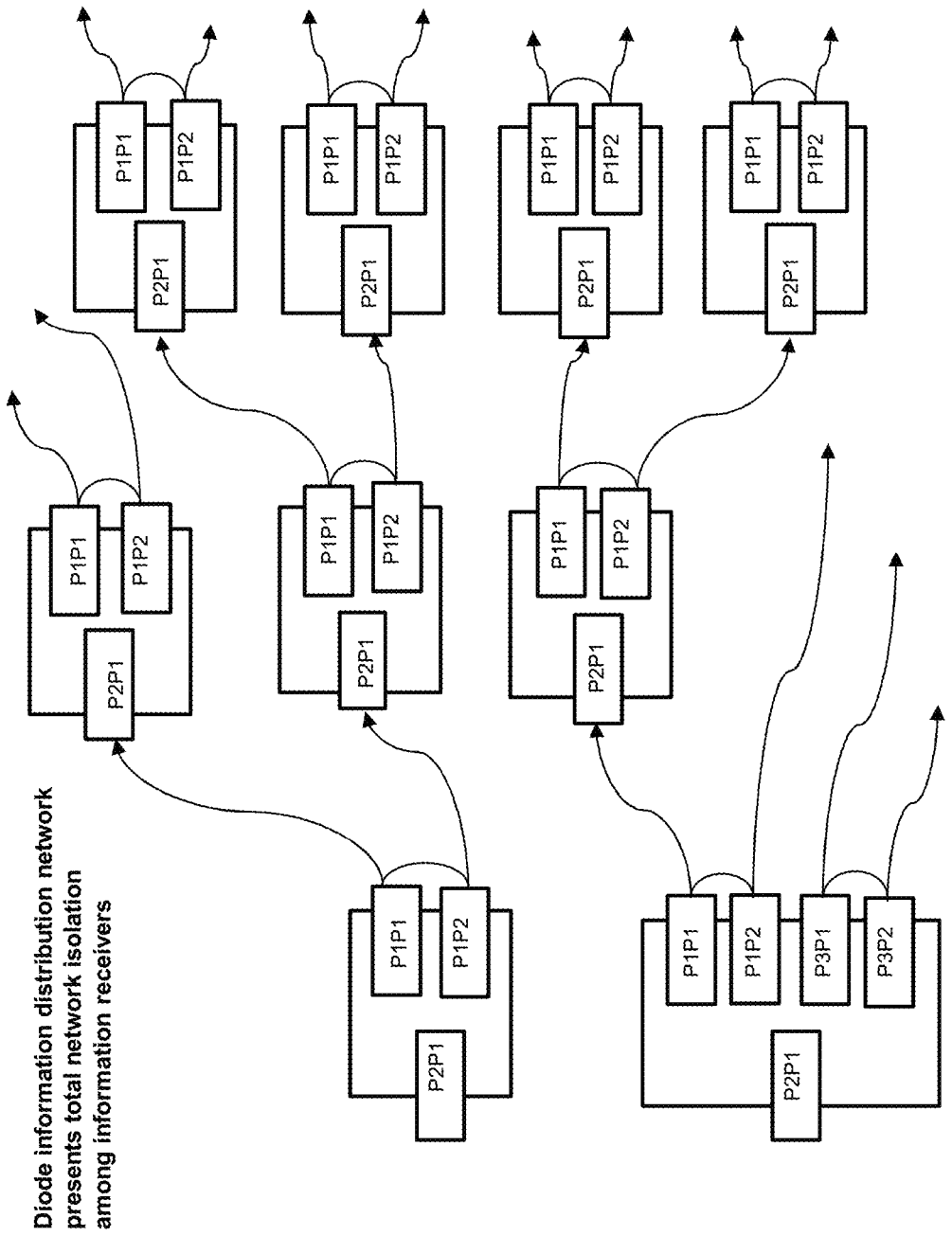

FIG. 5D shows an example expansion of the configuration illustrated in FIG. 5C. In the arrangement shown in FIG. 5D, information flows from a source to multiple recipient destinations present complete network isolation from one-another, and the fan-like flow of information may be extended to an arbitrarily large number of recipients.

Figure 5E:
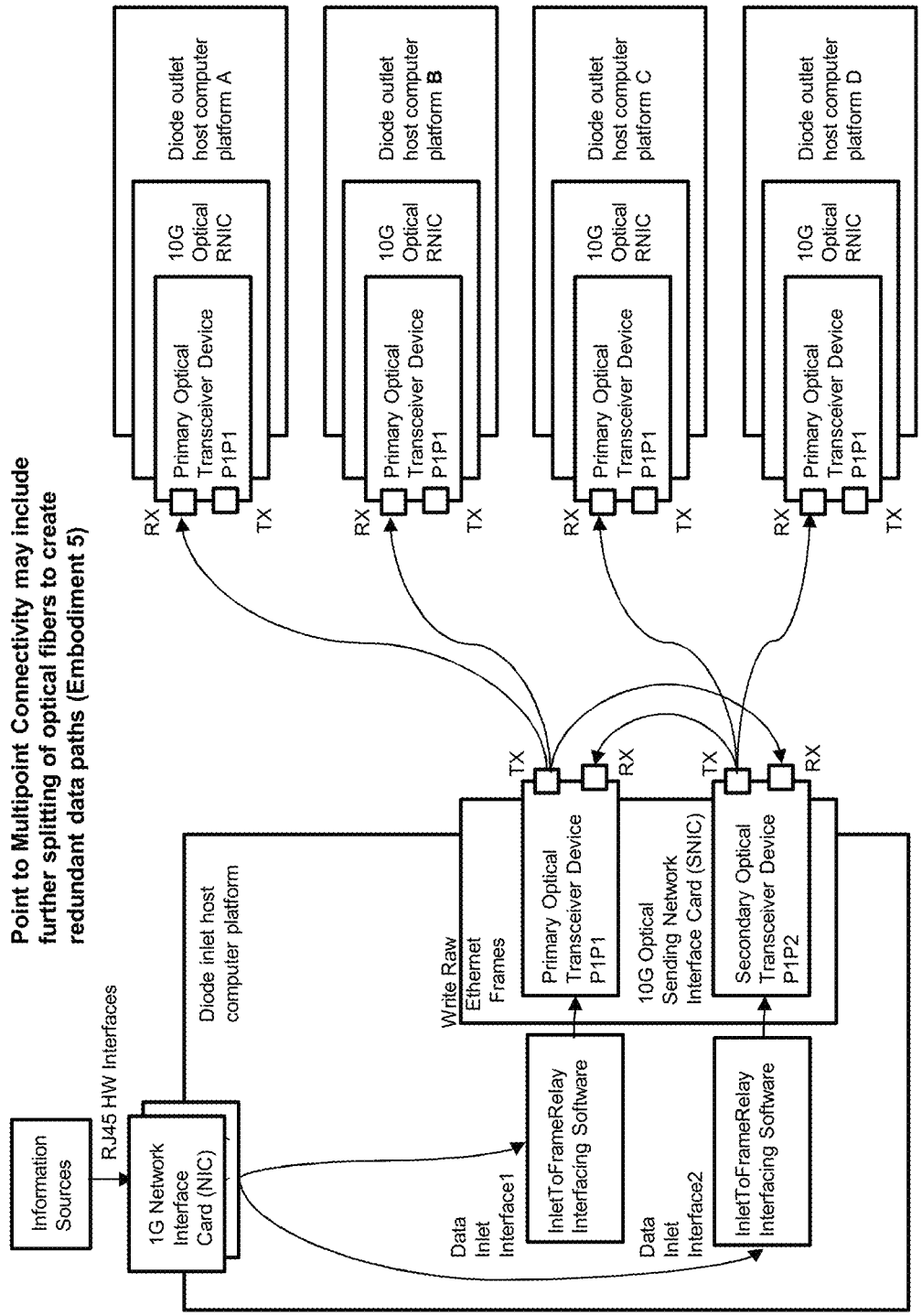

FIG. 5E shows an example expansion of the configuration illustrated in FIG. 5C. In the arrangement shown in FIG. 5E, information flows from a source to multiple recipient destinations include additional split fibers that create fan-like flow of duplicate information through multiple, redundant data paths; which may be extended to an arbitrarily large number of recipients.

Figure 6:
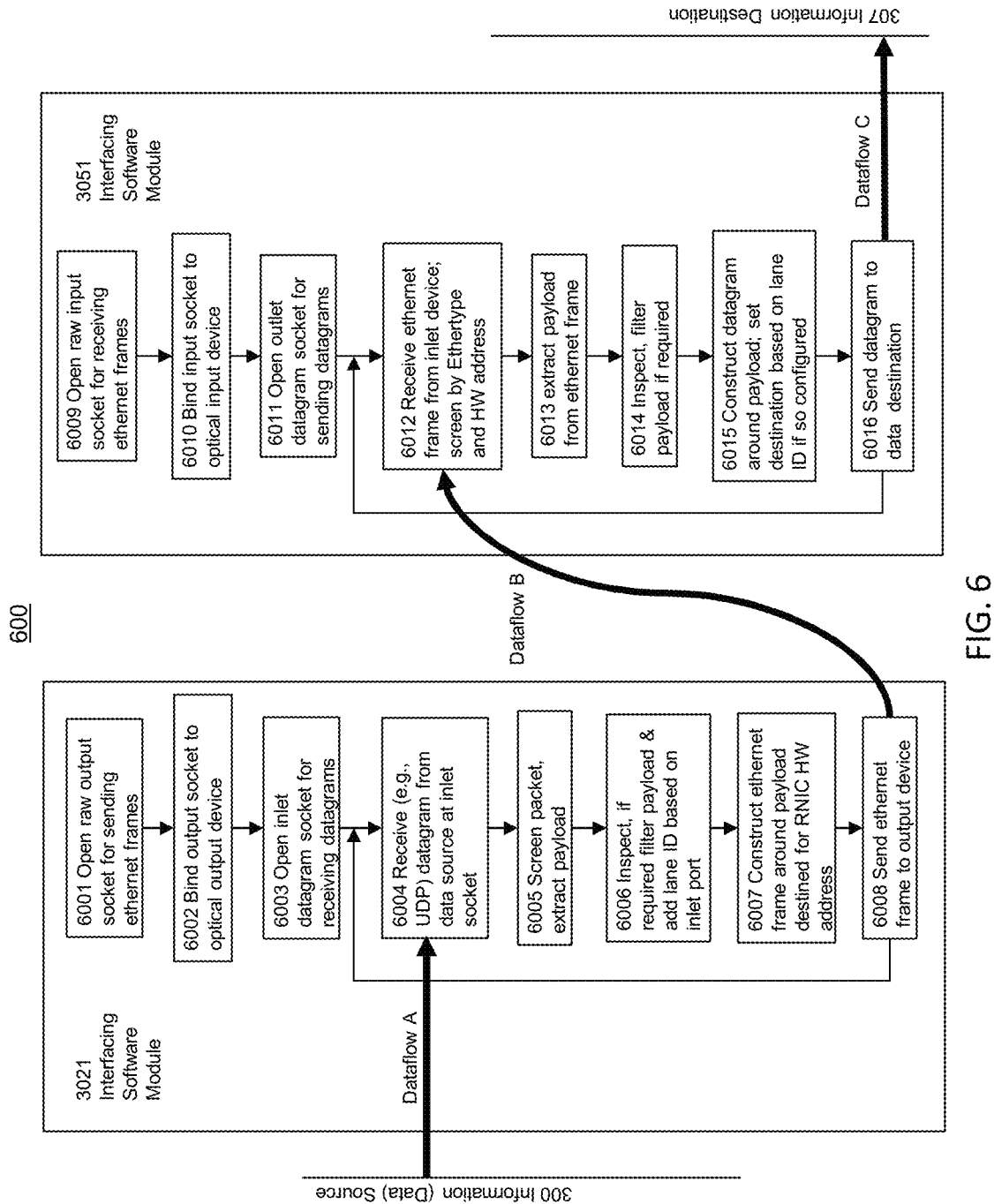

FIG. 6 shows an illustration of an example logic flow 600 implemented by the interfacing software 3021 (on the "sending" side of the one-way information flow control device or system 100) and the interfacing software 3051 (on the "receiving" side of the one-way information flow control device or system 100) in conjunction with the optical hardware elements (e.g., SNIC 31, RNIC 33, and the optical fibers 320, 321 and 322 shown in FIGS. 4 and 5) for achieving the one-way information flow according to the present disclosure. Logic blocks 6001 through 6008 are implemented by the interfacing software 3021. In the logic block 6001, the interfacing software 3021 opens a raw output (sending) socket for sending, e.g., Ethernet, frames. In the logic block 6002, the interfacing software 3021 binds the output (sending) socket to the optical output device, e.g., optical sending network interface card (SNIC) 31. In the logic block 6003, the interfacing software 3021 opens an inlet datagram socket for receiving datagram(s), e.g., UDP datagram socket (corresponding to UDP socket 302 shown in FIGS. 4 and 5), and in the logic block 6004, datagram (e.g., UDP datagram in Dataflow A portion) from the information source 300 is received at the inlet datagram socket.

Subsequently, the received datagram packet is screened and the payload portion is extracted in the logic block 6005, followed by the logic block 6006 in which the extracted payload is inspected and filtered (if necessary), as well as optionally adding (if required) lane ID based on inlet port (the lane ID implementation will be explained in further detail below). Data filters may be invoked by the interfacing software 3021 if additional constraints on forward information flow are desirable, e.g., making forward transfer of payload conditional on conformance of payload data to a specific protocol (such as MPEG-TS (MPEG transport stream) protocol, for example). In the logic block 6007, the interfacing software 3021 constructs an Ethernet frame around the payload destined for the hardware address of the RNIC 33 (the Ethernet frame structure and the nesting of UDP packets within IP packets and Ethernet frames will be explained in further detail below). In the logic block 6008, the Ethernet frame is sent to the output device (e.g., the SNIC 31 in FIGS. 4 and 5), from which the Ethernet frame is transmitted (see Dataflow B portion) to the RNIC 33 (using the media access control (MAC) address of the receiving transceiver device 313 and/or 314) on the receiving side where the interfacing software 3051 implements logic blocks 6009 through 6016.

In the logic block 6009, the interfacing software 3051 opens a raw input (receiving) socket for receiving, e.g., Ethernet, frames. In the logic block 6010, the interfacing software 3051 binds the input (receiving) socket to the optical input device, e.g., optical receiving network interface card (SNIC) 33. In the logic block 6011, the interfacing software 3051 opens an outlet datagram socket for sending datagram(s), e.g., UDP datagram socket (corresponding to UDP socket 305 shown in FIGS. 4 and 5). In the logic block 6012, the Ethernet frame (e.g., in Dataflow B portion) from the "sending" side of the one-way information flow control device or system 100 is received at the RNIC 33, which received Ethernet frame may be screened, e.g., by Ethertype and the hardware address. In the logic block 6013, the payload portion is extracted from the Ethernet frame, followed by the logic block 6014 in which the payload is inspected and filtered (if necessary). Data filters may be invoked by the interfacing software 3051 if additional constraints on forward information flow are desirable, e.g., making forward transfer of payload conditional on conformance of payload data to a specific protocol (such as MPEG-TS, for example). In the logic block 6015, the payload is encapsulated in a datagram, e.g., UDP datagram, for transmission to a destination (the destination may be set based on lane ID, if lane ID is used). In the logic block 6016, the datagram is sent (Dataflow C portion) to the information destination 307, e.g., via the UDP socket 305.

Figure 7:
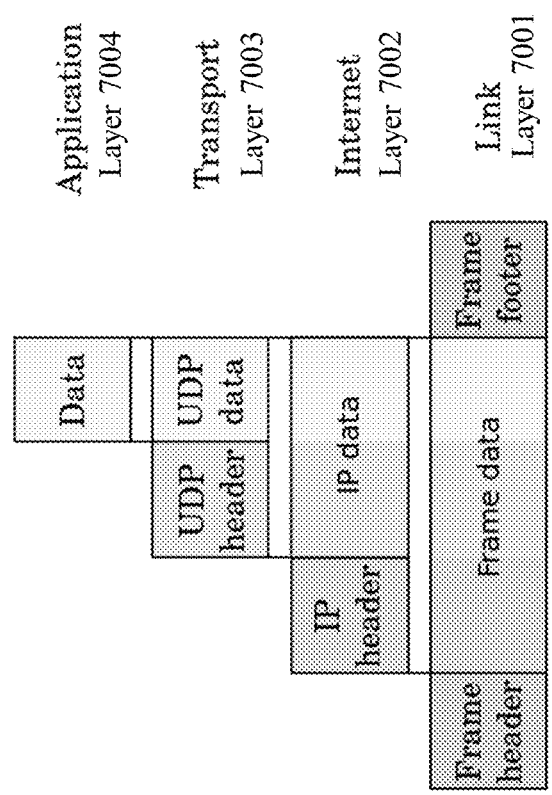

FIG. 7 shows an example layer stack which illustrates nesting of UDP packets within IP (Internet Protocol) packets and Ethernet frames in accordance with Transmission Control Protocol/Internet Protocol (TCP/IP) communication model (although the discussion here regarding the layer stack of TCP/IP may be applied to a simplified layer stack of Open System Interconnection (OSI) model). TCP/IP is a layered protocol, according to which transmitting software gives the data to be transmitted to the application layer, where the data is processed and subsequently passed from layer to layer down the layer stack, with each layer performing its assigned functions. As the data is passed through the layer stack, each layer adds a header to the data that directs and identifies the packet, which process is called encapsulation. The header and data together form the data packet for the next layer that, in turn, adds its header, and the process is repeated through the layer stack, until the combined encapsulated data packet is finally transmitted over the physical layer of the network to the destination device. The receiving device's software reverses the process, de-encapsulating the data at each layer as the data is passed up through the layers of the layer stack, with each layer performing its assigned operations until the data is ready for use by the receiving device's software.

As shown in FIG. 7, the layer stack according to TCP/IP model has four layers: application layer 7004; transport layer 7003; Internet (IP) layer 7002; and link layer 7001. In the application layer 7004, applications (or processes) generate user data and communicate the data to other applications, e.g., on the same host or on another host. The applications (or processes) make use of the services provided by the lower layers, e.g., the transport layer 703, which provides "pipes" to other processes that are addressed via ports which essentially represent services. Higher-level protocols, e.g., HTTP (Hypertext Transfer Protocol), SMTP (Simple Mail Transfer Protocol), FTP (File Transfer Protocol), and SSH (Secure Shell), operate in the application layer 7004. The transport layer 7003, which performs host-to-host communications, provides a channel for the communication needs of applications. In the example shown in FIG. 7, UDP is the example protocol used for the transport layer 7003. The internet layer 7002, which performs the task of exchanging datagrams across network boundaries, defines the addressing and routing structures used for the TCP/IP protocol suite. Example protocols used in the internet layer 7002 are Internet Protocol (IP) and ARP (Address Resolution Protocol). It should be noted that in the hardware-enforced one-way information flow control device or system 100 according to the present disclosure, IP and ARP protocols are not required and are not used for the communication between the SNIC 31 and the RNIC 33. The link layer (or network access layer) 7001 defines details of how data is physically sent through the network, including how bits are electrically or optically signaled by hardware devices that interface directly with a network medium, e.g., optical fibers or twisted pair copper wire. An example protocol used for the link layer 7001 is Ethernet, a generalized frame structure for which is shown in FIG. 7.

Figure 8:
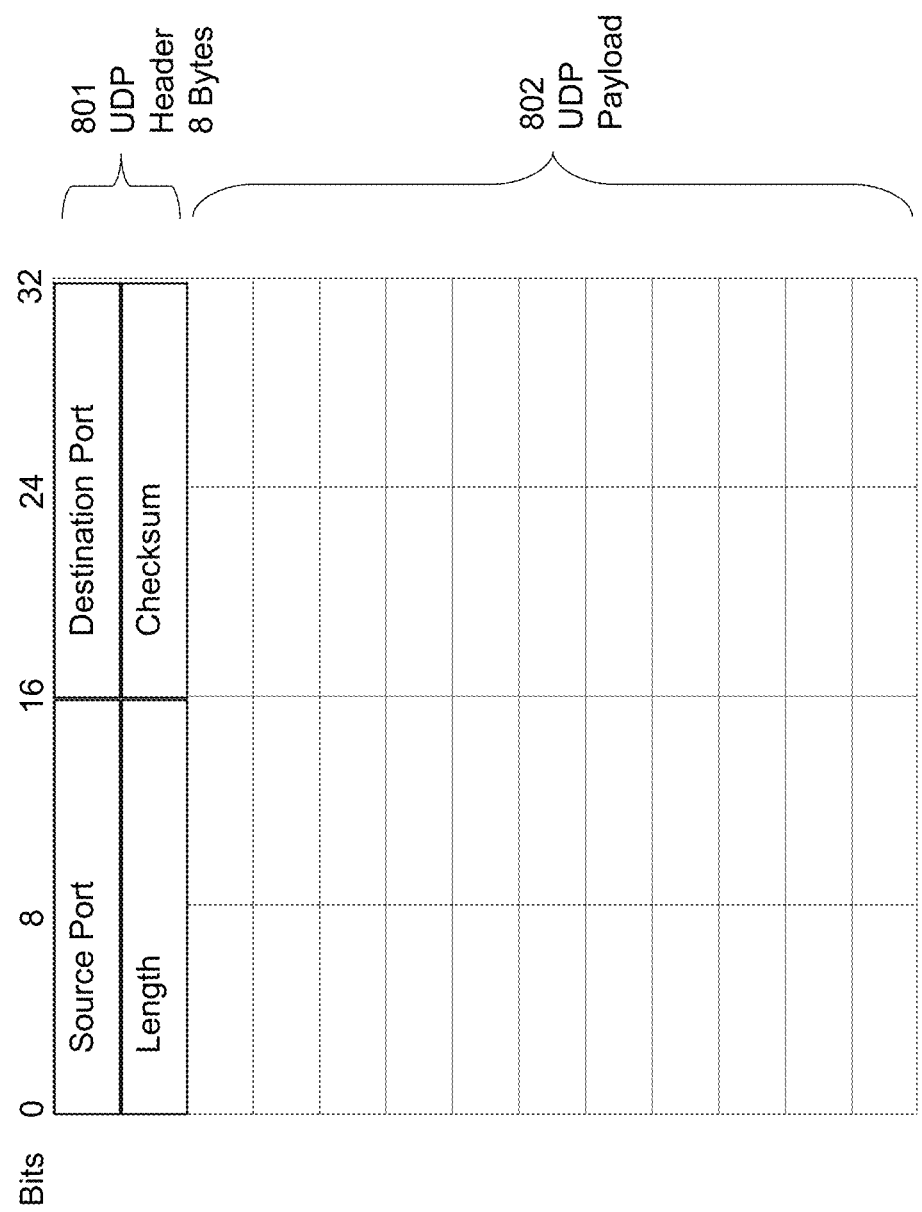

As mentioned above, SNIC interfacing software 3021 receives data through standard UDP datagram receiving sockets (e.g., UDP socket 302 shown in FIGS. 4 and 5). FIG. 8 illustrates an example UDP datagram format, which includes the UDP header 801 and the UDP payload 802. The UDP header 801 consists of 8 bytes and includes the following fields: source port (2 bytes); destination port (2 bytes); length (2 bytes); and checksum (2 bytes). The remaining bytes of the UDP datagram form the UDP payload 802.

The term "port" used in the context of the UDP datagram shown in FIG. 8 should be distinguished from the hardware ports (e.g., TX and RX ports of the transceiver devices 311-314 in FIGS. 4-5). In UDP, which is a transport layer protocol, the UDP port number is a 16-bit unsigned integer ranging from 0 to 6553, and a given process associates its input or output channel, via a socket, with a transport protocol and a port number, thereby enabling sending and receiving data via the network.

Figure 9:
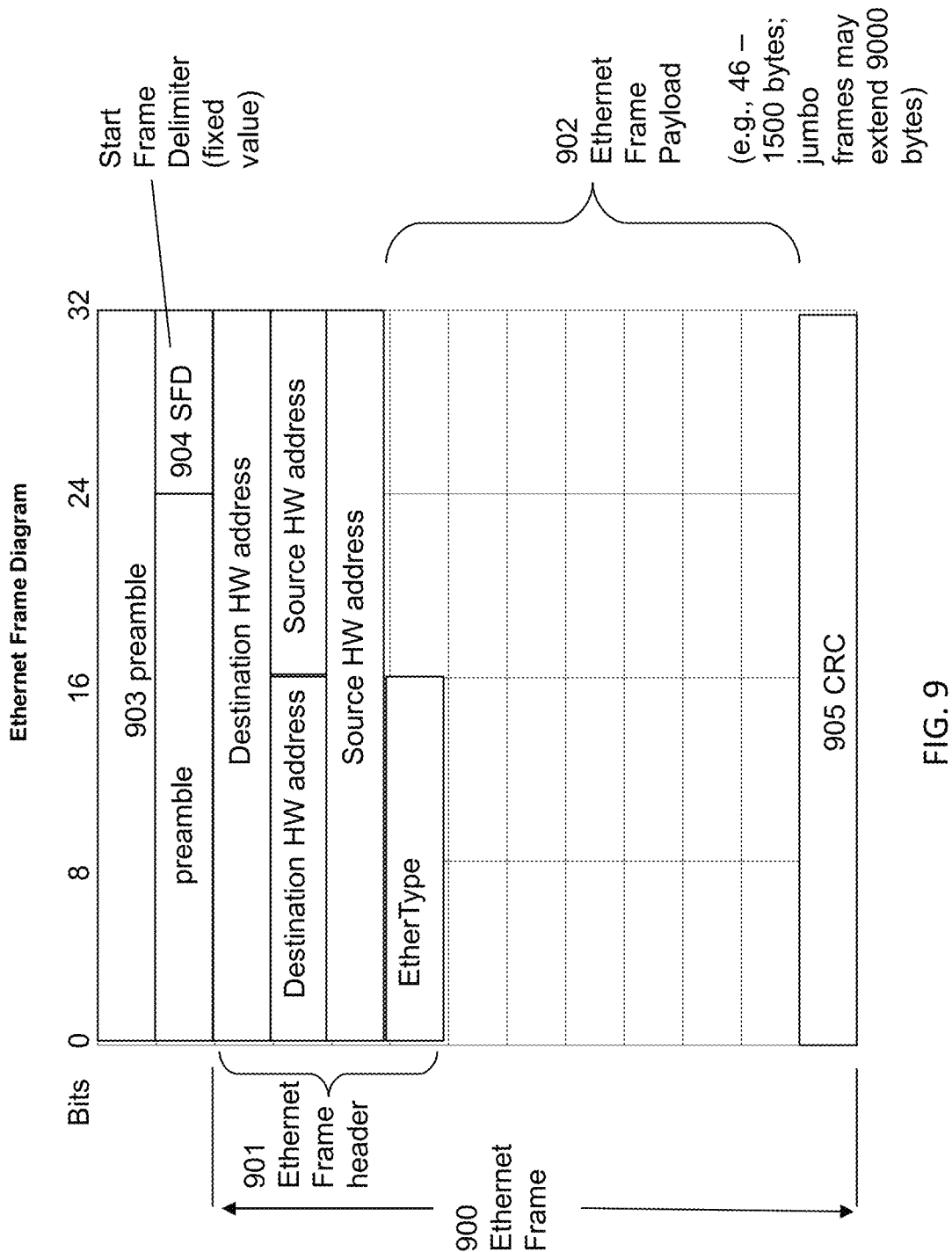
Figure 10:
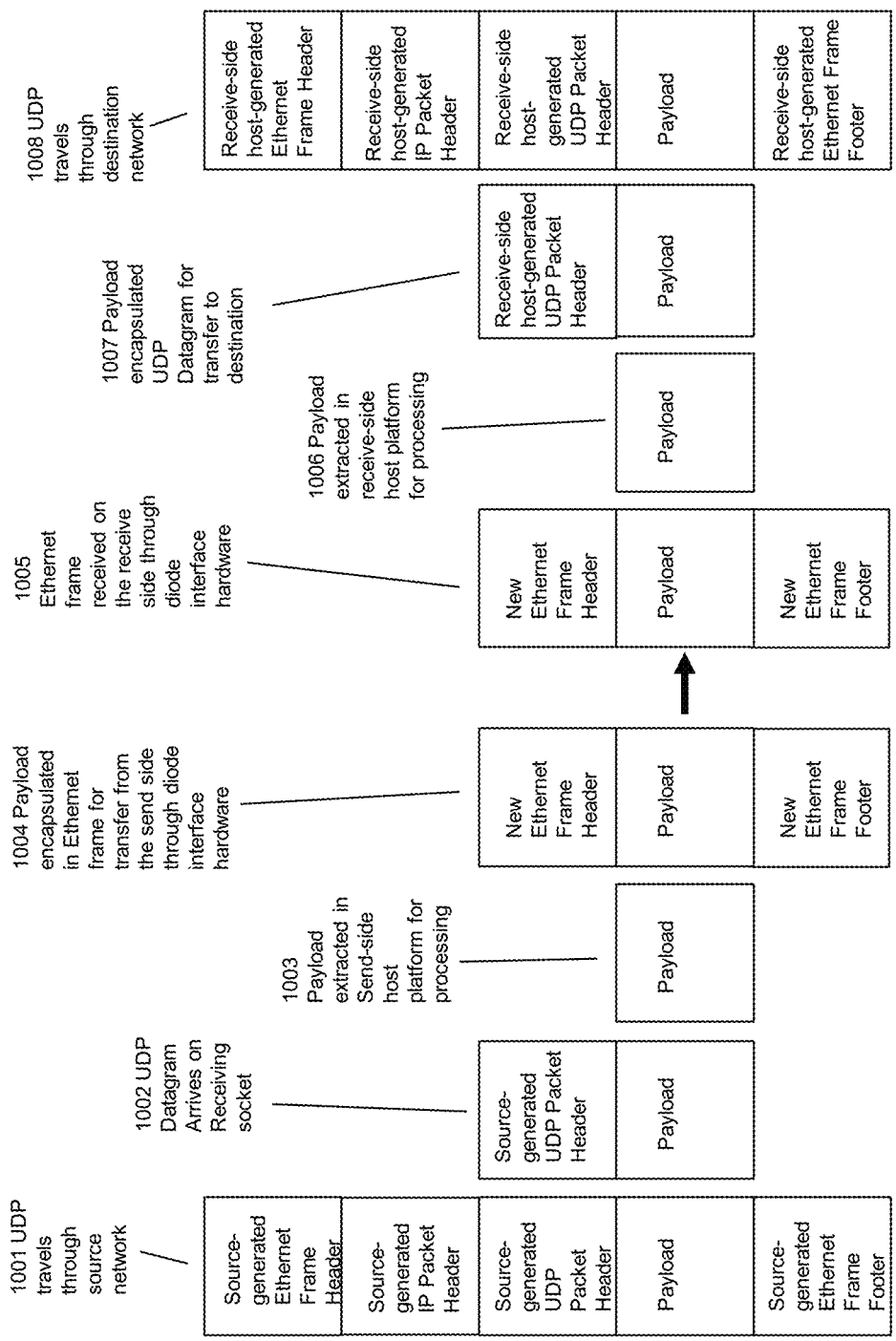

As illustrated in FIG. 10, which will be further explained below, in the one-way information flow control device or system 100, only the UDP datagram payload is relayed to the SNIC hardware (e.g., transceiver 311 and/or 312 of SNIC 31 shown in FIGS. 4 and 5) for further transmission as part of raw Ethernet frame(s) whose hardware destination address matches the MAC address of the transceiver device(s) of the RNIC (e.g., transceiver 313 and/or 314 shown in FIGS. 4 and 5). An example Ethernet frame format, which is illustrated in FIG. 9, will be further explained below. Note that in FIGS. 4 and 5, the Ethernet frames sent by the SNIC primary transceiver 311 are rejected by the SNIC secondary transceiver device 312, but are received by the RNIC primary transceiver device 313 as raw Ethernet frames destined for its own MAC address. Similarly, in FIG. 5A, the Ethernet frames sent by the SNIC secondary transceiver 312 are rejected by the SNIC primary transceiver device 311, but are received by the RNIC secondary transceiver device 314 as raw Ethernet frames destined for its own MAC address. When the RNIC interfacing software 3051 receives the Ethernet frames, only the frame payload is relayed forward, and the RNIC interfacing software 3051 encapsulates the frame payload for transmission to the destination as UDP datagrams, as shown in FIG. 10.

As shown in FIG. 9, the Ethernet frame 900 is preceded by a preamble 903 field (7 bytes) and SFD (start frame delimiter) 904 field (1 byte). The Ethernet frame 900 includes Ethernet frame header 901, Ethernet frame payload 902, and cyclic redundancy check (CRC) 905. The Ethernet frame header 901 includes the following fields: destination hardware address (MAC address) (6 bytes); source hardware address (MAC address) (6 bytes); and Ether type (2 bytes). Ethertype values are defined in IEEE RFC7042 and RFC1701, and are located at byte [20] of the Ethernet frame shown in FIG. 9. For example, EtherType value of 0x6559 indicates a "raw frame relay" Ethernet frame. The Ethernet frame payload 902 may be, e.g., 46-1500 bytes, with some jumbo frames being as large as 9000 bytes.

FIG. 10 shows a data-centric flow diagram illustrating various stages of data transfer and the associated data packet formatting as the data is transmitted from the information source network to the destination network via the send side and the receive side of the one-way information flow control device or system 100. At stage 1001, as UDP travels through the information source network (e.g., information source 300 shown in FIG. 4A), the data packet may include, e.g., information-source-generated Ethernet frame header, information-source-generated IP packet header, information-source-generated UDP packet header, the payload, and information-source-generated Ethernet frame footer. At stage 1002, when the UDP datagram arrives on the receiving-side UDP socket, the data packet may include, e.g., information-source-generated UDP packet header, and the payload. At stage 1003, the payload is extracted in the send-side host platform (e.g., by the interfacing software 3021 shown in FIGS. 4 and 5). At stage 1004, the payload is encapsulated in Ethernet frame for transfer from the send side of the one-way information flow control device or system 100 to the receive side, via the interface hardware, e.g., SNIC 31 and RNIC 33 shown in FIGS. 4 and 5. At stage 1005, the Ethernet frame is received on the receive side of the one-way information flow control device or system 100, via interface hardware. At stage 1006, the payload is extracted in the receive-side host platform (e.g., by the interfacing software 3051 shown in FIGS. 4 and 5) for processing. At stage 1007, the payload is encapsulated in UDP datagram for transfer to the destination. At stage 1008, the UDP datagram travels through the destination network.

In accordance with the hardware-enforced one-way information flow control device or system 100 of the present disclosure, IP and ARP protocols are not required and are not used for the communication between the SNIC 31 and the RNIC 33. The RNIC does not require promiscuous mode configuration. Raw Ethernet frames as implement in accordance with the present disclosure, e.g., as illustrated in FIG. 9, do not contain any IP information and are not routable. The RNIC 33, which operates as a connectionless sniffer, receives and processes all Ethernet frames that are addressed specifically to the hardware address of the primary receiving transceiver device 313 (in the case of the embodiments shown in FIGS. 4 and 5) and to the hardware address of the secondary receiving transceiver device 314 (in the case of the embodiment shown in FIG. 5A), while other Ethernet frames are ignored by the RNIC 33. Ethernet frames addressed to the receiving transceiver devices 313 and 314 are not routable, as they would be ignored by any other network device presenting a different hardware address. On the receiving side, Ethernet frames not presenting the expected Ethertype are dropped by RNIC interface software (e.g., interfacing software 3051).

In accordance with the hardware-enforced one-way information flow control device or system 100 of the present disclosure, the Ethernet frame's source hardware address (see, e.g., FIG. 9) is irrelevant to the data transfer process, and the source hardware address field within the Ethernet frame may be reused for unrelated protocol information, or retained for purposes of security screening by RNIC interfacing software 3051. In addition, the RNIC 33 need not be configured to receive Ethernet frames in promiscuous mode operation in order to operate properly. However, in cases where promiscuous mode operation is implemented (e.g., due to deeply embedded device configurations which are not easily changeable), the RNIC interfacing software 3051 may filter incoming ethernet frames based on Ethertype, source hardware address, and/or destination hardware address, all of which are accessible fields in the Ethernet frame header.

To recap, in accordance with the hardware-enforced one-way information flow control device or system 100 of the present disclosure, the interfacing software 3021 and 3051 access SNIC 31 and RNIC 33, respectively, using raw socket programming techniques, in which raw sockets provide programming access to Ethernet frames where hardware (MAC) addresses and EtherType fields can be set and read. In addition, the split optical fiber connection is utilized to provide the hardware-enforced one-way information flow, along with the use of raw Ethernet frames, in which specific destination hardware addresses are specified, e.g., matched to the RNIC transceiver MAC address, or set to the explicit value of 0xFFFFFFFFFFFF (in which case it is broadcast to all hardware addresses).

As mentioned above, each optical transceiver (e.g., 311-314) in the SNIC 31 and RNIC 33 presents a unique hardware address, also known as a Media Access Control (MAC) address, which is a unique identifier comprising 6 bytes and assigned to network interfaces for communications at the data link layer of a network segment. MAC address is used as a network address for most IEEE 802 network technologies, e.g., Ethernet and Wi-Fi. Logically, MAC addresses are used in the media access control protocol sublayer of the OSI reference model, for example. MAC addresses for the transceiver devices of SNIC 31 and RNIC 33 are visible to the operating systems of their respective host computer platforms.

Figure 11:
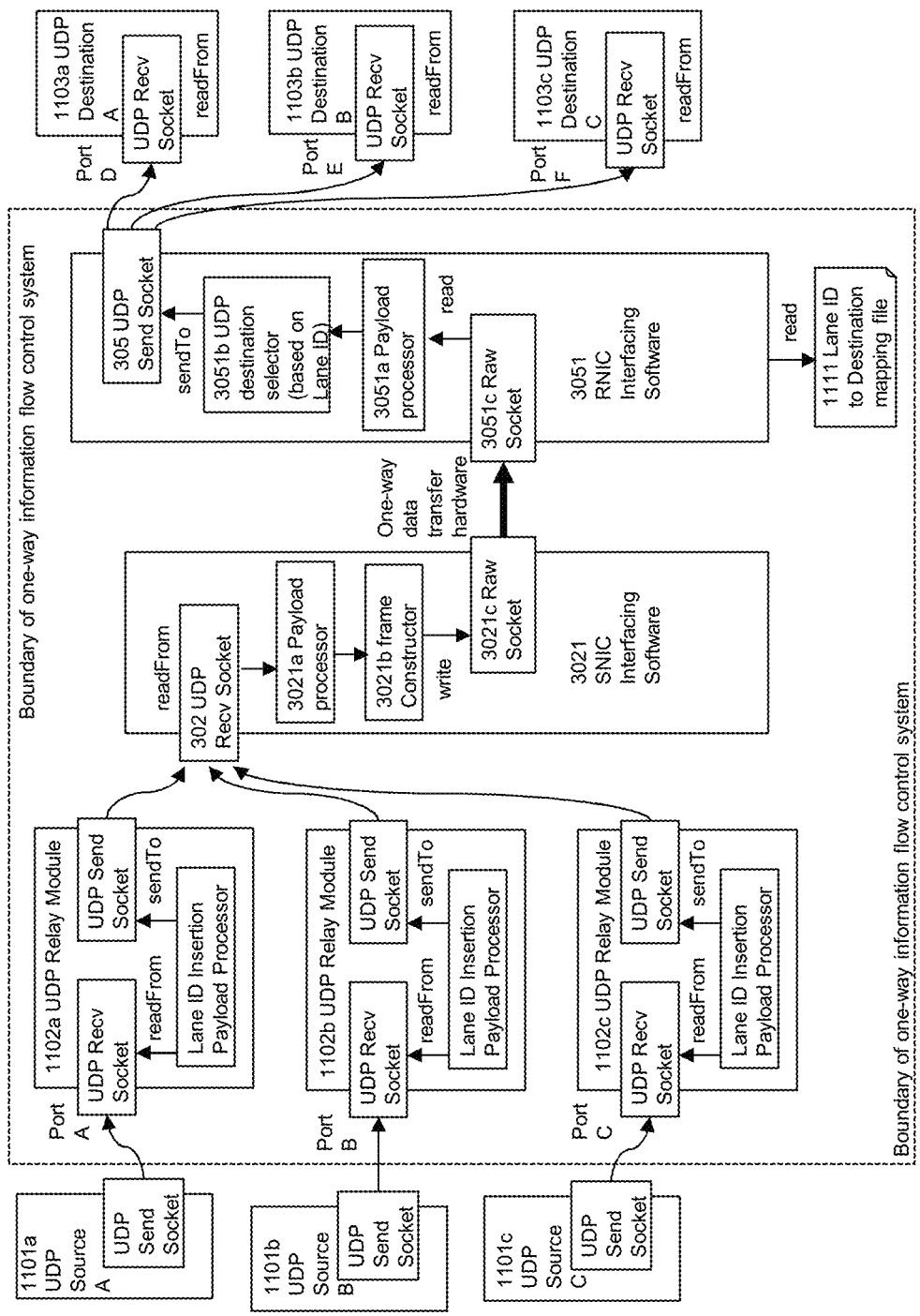
Figure 12:
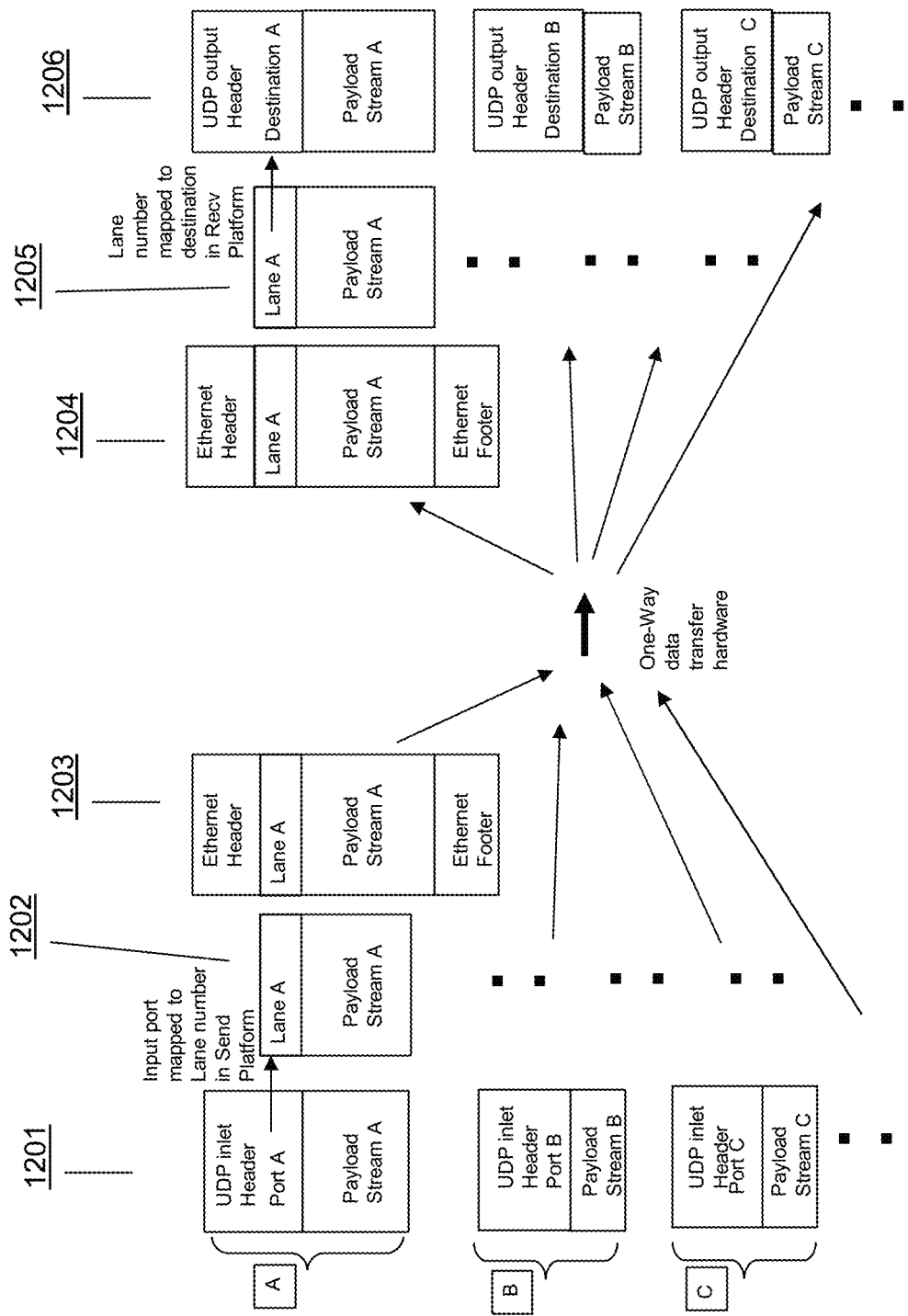

In an example embodiment, e.g., as illustrated in FIGS. 11 and 12, one-way information flow control device or system of the present disclosure may be configured to transfer multiple concurrent lanes of independent information streams (e.g., multiple channels of streaming video) by inserting lane identifiers into UDP datagrams received in different inlet port numbers. In this example embodiment, the interface software for the RNIC associates each lane identifier with a different IP destination address and a port number. The number of configurable lanes is limited only by overall channel capacity of the one-way information flow control device or system (e.g., in the order of 10 Gbit/second) and bandwidth requirements of each individual lane. When lane identifiers are used, the one-way information flow control device or system conforms to a one-way information transfer pipeline that inherently supports a publisher/subscriber use case model. Only the send computing platform determines information flow into the invention, thereby publishing to an external platform. Only the receiving computer platform determines information flow from the invention, thereby subscribing to available information feeds.

FIG. 11 illustrates multiple independent streams of UDP packet flows using lane identifiers, which FIG. 11 provides a software-module-centric view of the UDP packet flows. In the example embodiment shown in FIG. 11, the SNIC interfacing software 3021 is augmented with UDP relay modules A (1102*a*, with associated port A), B (1102*b*, with associated port B) and C (1102*c*, with associated port C), to which multiple independent streams of UDP packets originating from UDP sources A (1101*a*), B (1101*b*) and C (1101*c*) are respectively relayed. UDP relay modules A (1102*a*), B (1102*b*) and C (1102*c*) each insert a lane identifier (ID) (e.g., lane A, lane B, lane C, etc.) based on the port assignment (e.g., port A, port B, port C, etc.) into the UDP packet in the respective UDP packet stream. The SNIC interfacing software 3021 receives the multiple independent streams of UDP packets corresponding to lanes A, B and C via the UDP receiving socket 302. The multiple independent streams of UDP packets corresponding to lanes A, B and C are processed by the payload processor 3021a and the frame constructor 3021b of the SNIC interfacing software 3021 to generate corresponding multiple independent streams of Ethernet frames for lanes A, B and C, which Ethernet frames are transmitted using raw sending socket 3021c to the receiving side, i.e., RNIC 33. On the receiving side, the multiple independent streams of Ethernet frames are received using raw socket 3051c, and the corresponding multiple independent streams of UDP packets corresponding to lanes A, B and C are generated from the received Ethernet frames by the payload processor 3051a and the UDP destination selector 3051b of the RNIC interfacing software 3051, using the lane-ID-to-destination mapping file 1111. The multiple independent streams of UDP packets are sent, e.g., using the UDP send socket 305, to the respective destinations (e.g., destination 1103a with assigned port D for UDP stream A, destination 1103b with assigned port E for UDP stream B, and destination 1103c with assigned port F for UDP stream C.

FIG. 12 shows a flow diagram illustrating multiple independent streams of UDP packet flows using lane identifiers, which FIG. 12 provides a data-centric view of the UDP packet flows. The various data packets stages (e.g., 1201 to 1206) shown in FIG. 12 substantially correspond to the various stages described above in connection with FIG. 11, which provides a software-module-centric view of the UDP packet flows.

Figure 13:
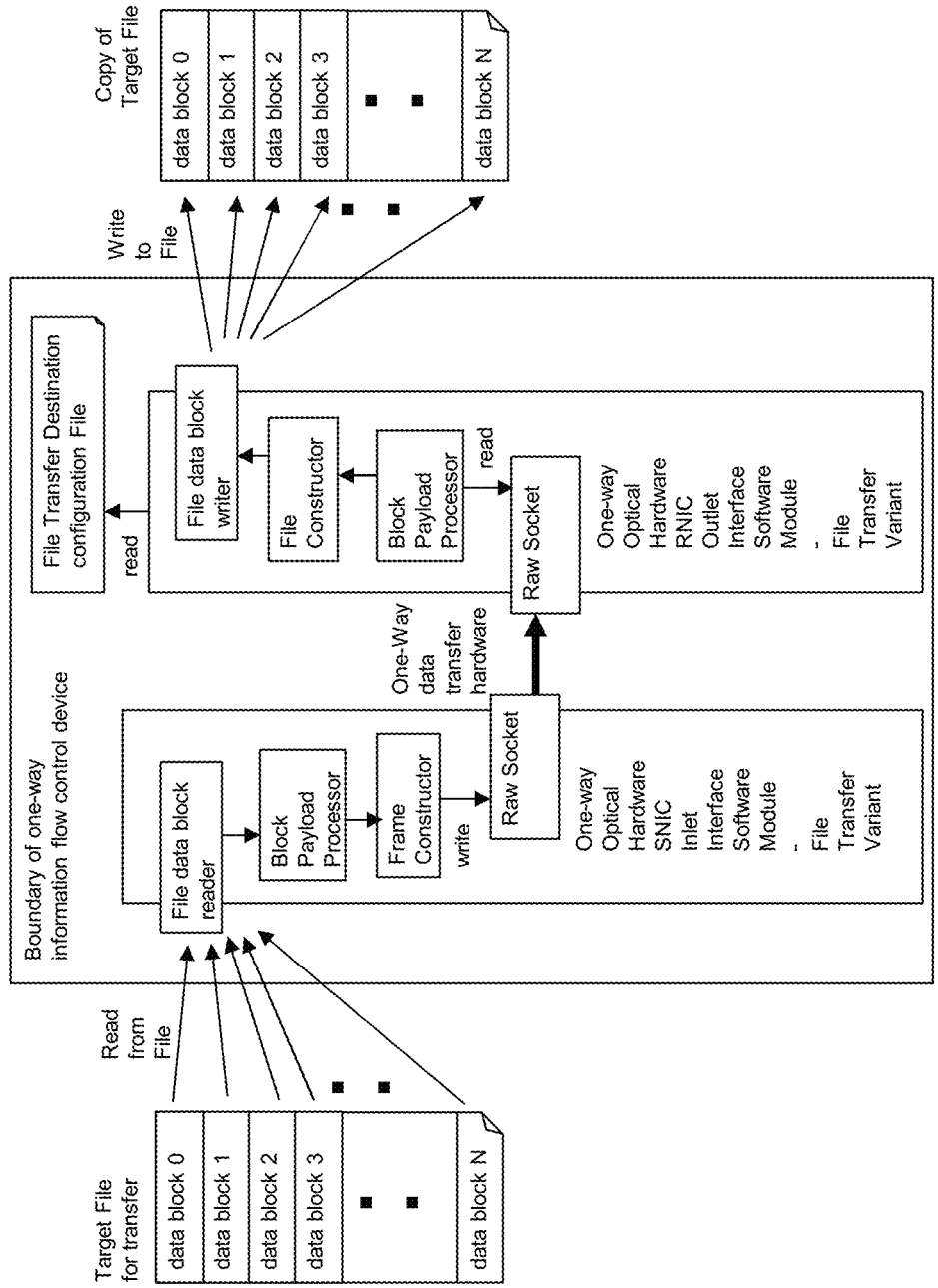

File transfers and other information flows may be achieved by direct resource access in proprietary interfacing software or by local protocol conversion to UDP datagrams at the inlet/outlet of the invention by separate software modules, including encrypted conduits and bilateral protocol proxies. FIG. 13 illustrates a software-module-centric view of a one-way direct file transfer mechanism using Ethernet frame relay. The target file to be transferred is read by the file data block reader of the SNIC interface, software, transferred through the one-way data transfer hardware using raw sockets to the receiving side, and a copy of the target file is written to the file transfer destination by the RNIC interface software module.

Figure 14:
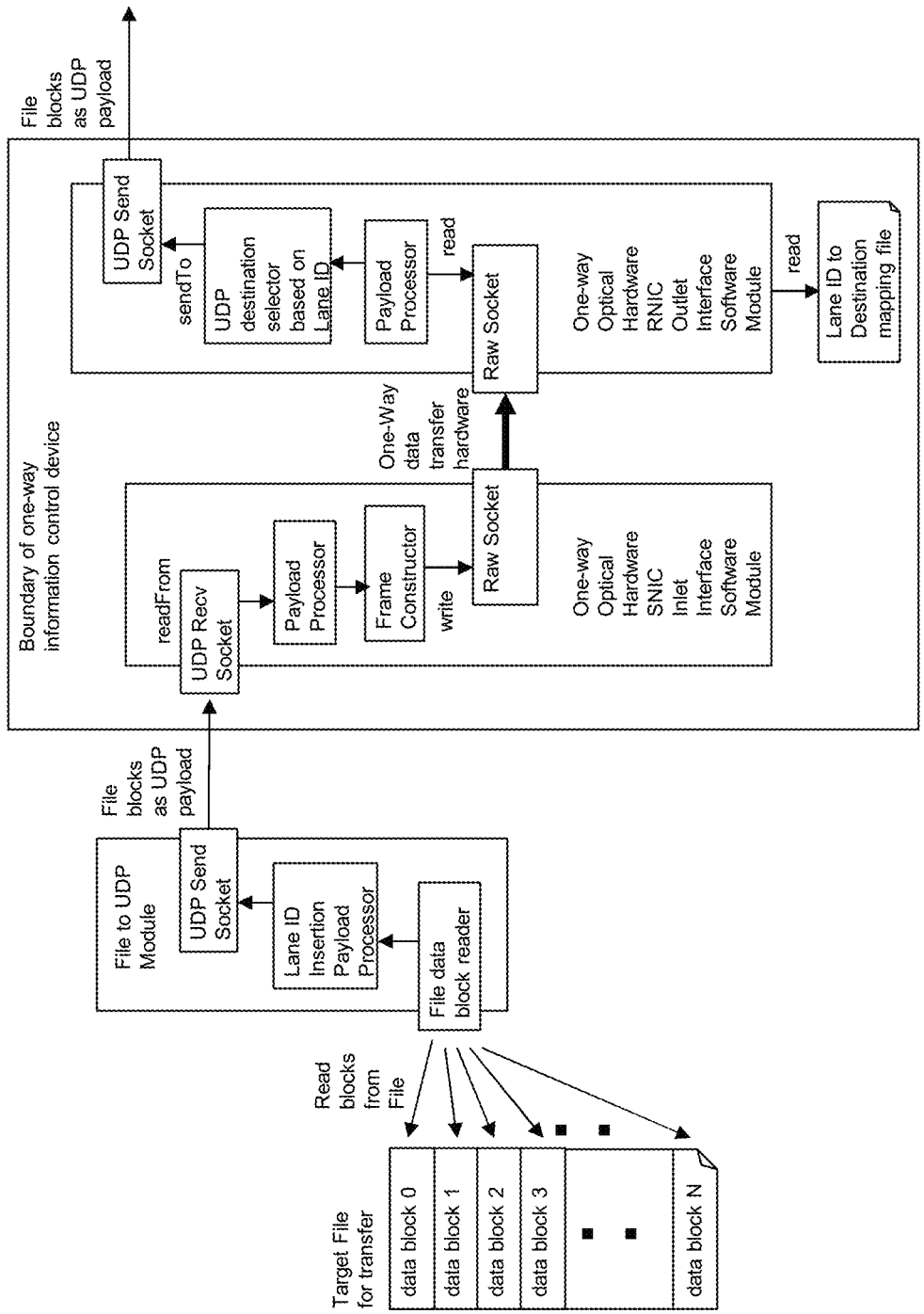
Figure 15:
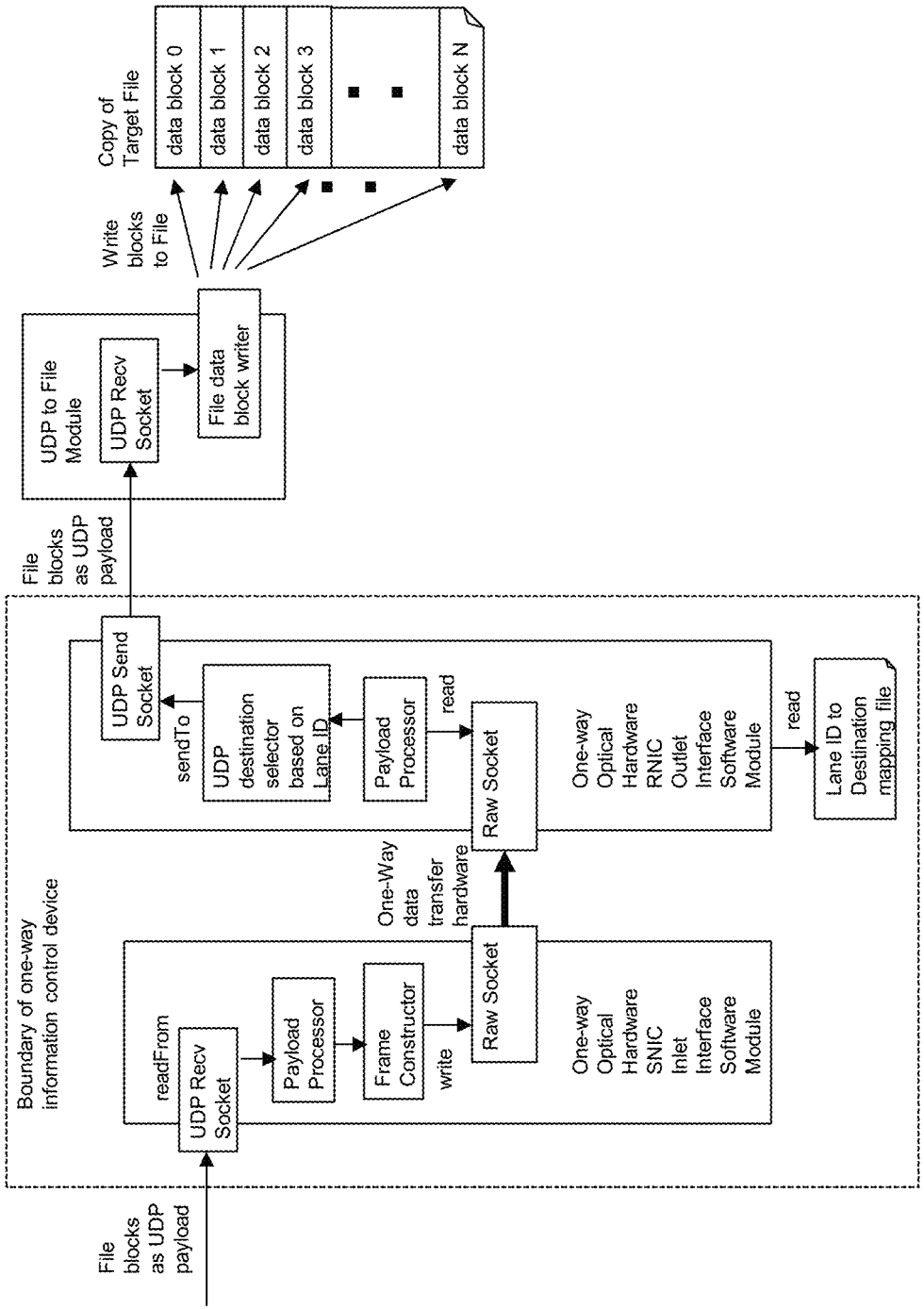

FIG. 14 illustrates a source-software-module-centric view of a one-way file transfer as a stream of UDP packets using lane identifiers. The target file to be transferred is read by the file-to-UDP module and transferred as UDP payload to the send-side of the one-way information control device. The SNIC interface software module transmits the payload transferred through the one-way data transfer hardware using raw sockets to the receiving side, and the RNIC interface software module transfers the file blocks as UDP payload to destinations as mapped to specific lane IDs associated with the payload streams. As shown in FIG. 15, which illustrates a destination-software-module-centric view of the one-way file transfer as a stream of UDP packets using lane identifiers illustrated in FIG. 14, the file blocks transmitted as UDP payload using the UDP send socket of the RNIC interface software is received by the UDP-to-file module, which in turn writes a copy of the target file to the file transfer destinations as mapped to specific lane IDs associated with the payload streams.

Figure 16:
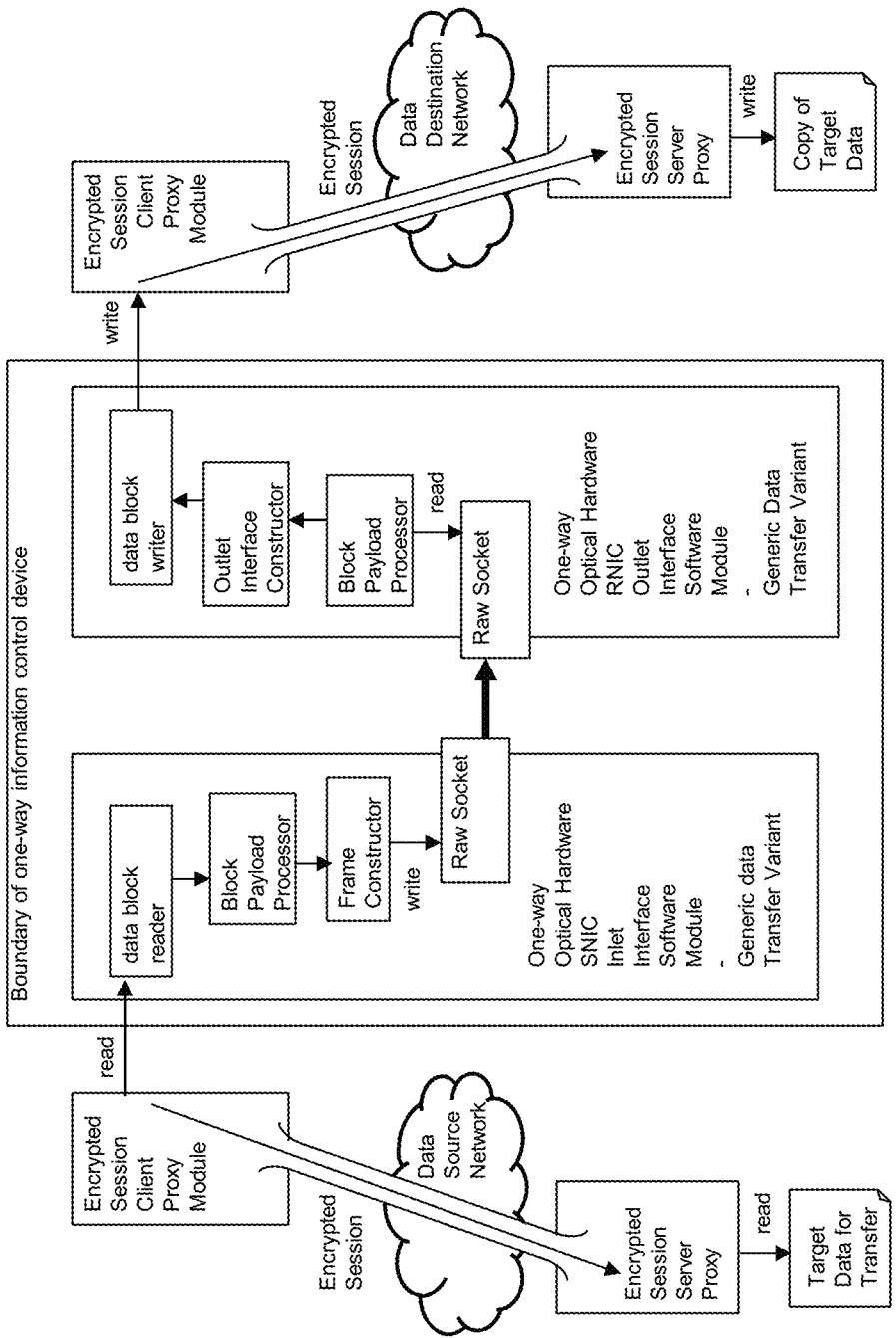

FIG. 16 illustrates an embodiment of one-way information flow control device or system which is coupled to the information source and destination using encrypted session proxy interfaces.

Figure 17:
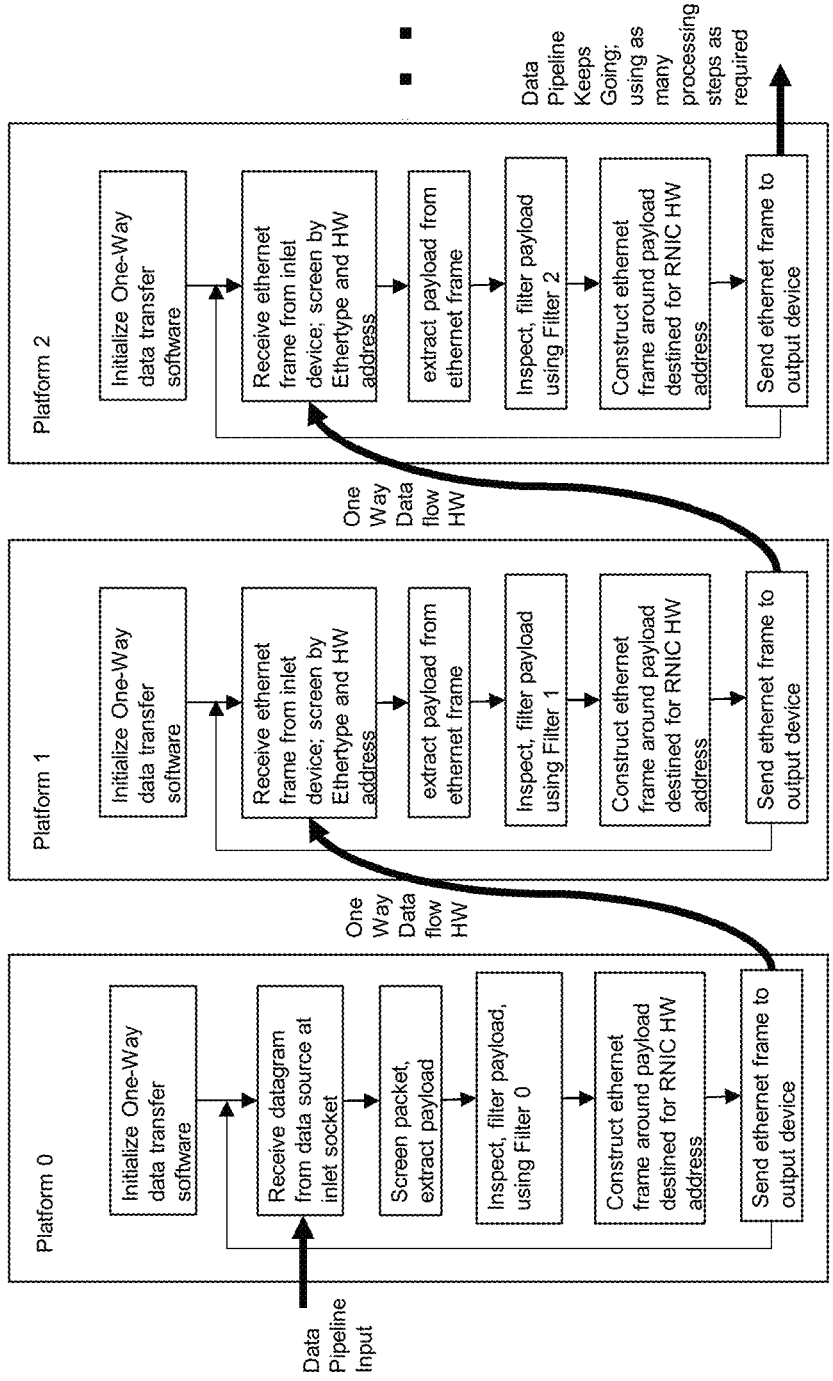

Data filters may be invoked by interfacing software if additional constraints on forward information flow are desirable. Multiple iterations of the one-way information flow control device, along with optional data filters, may be connected in series, e.g., as illustrated in FIG. 17, to create an assured one-way pipeline information flow architecture. The one-way pipeline information flow architecture shown in FIG. 17 may be modified, e.g., wrapped into a loop, thereby creating a "transactional closed travers" arrangement, which has beneficial applications in the field of transaction processing, for example.

Figure 18:
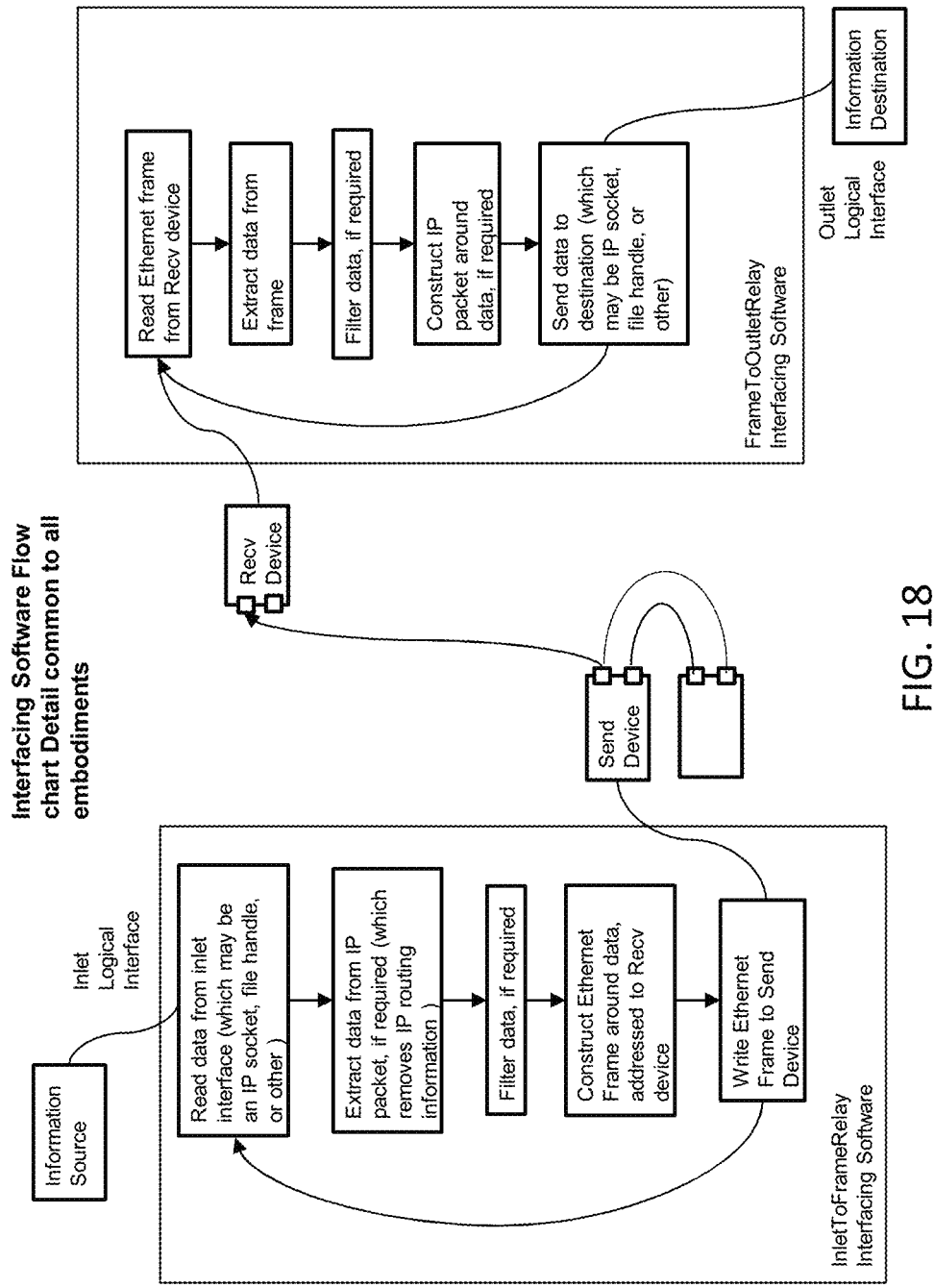

FIG. 18 is a flow diagram illustrating an example implementation of the non-routable "protocol break" (also referred to as "protocol transition") is achieved. Only raw Ethernet frames are sent to and from the SNIC and RNIC transceiver devices. The Hardware address fields in the Ethernet frames are matched to the RNIC device, which is a core feature of all embodiments described and illustrated in the present disclosure. Configured this way, there is no IP source or destination information in data that passes between the SNIC and RNIC host computers. In other words, the core Diode protocol is a "raw frame relay" that is not routable.

Figure 19:
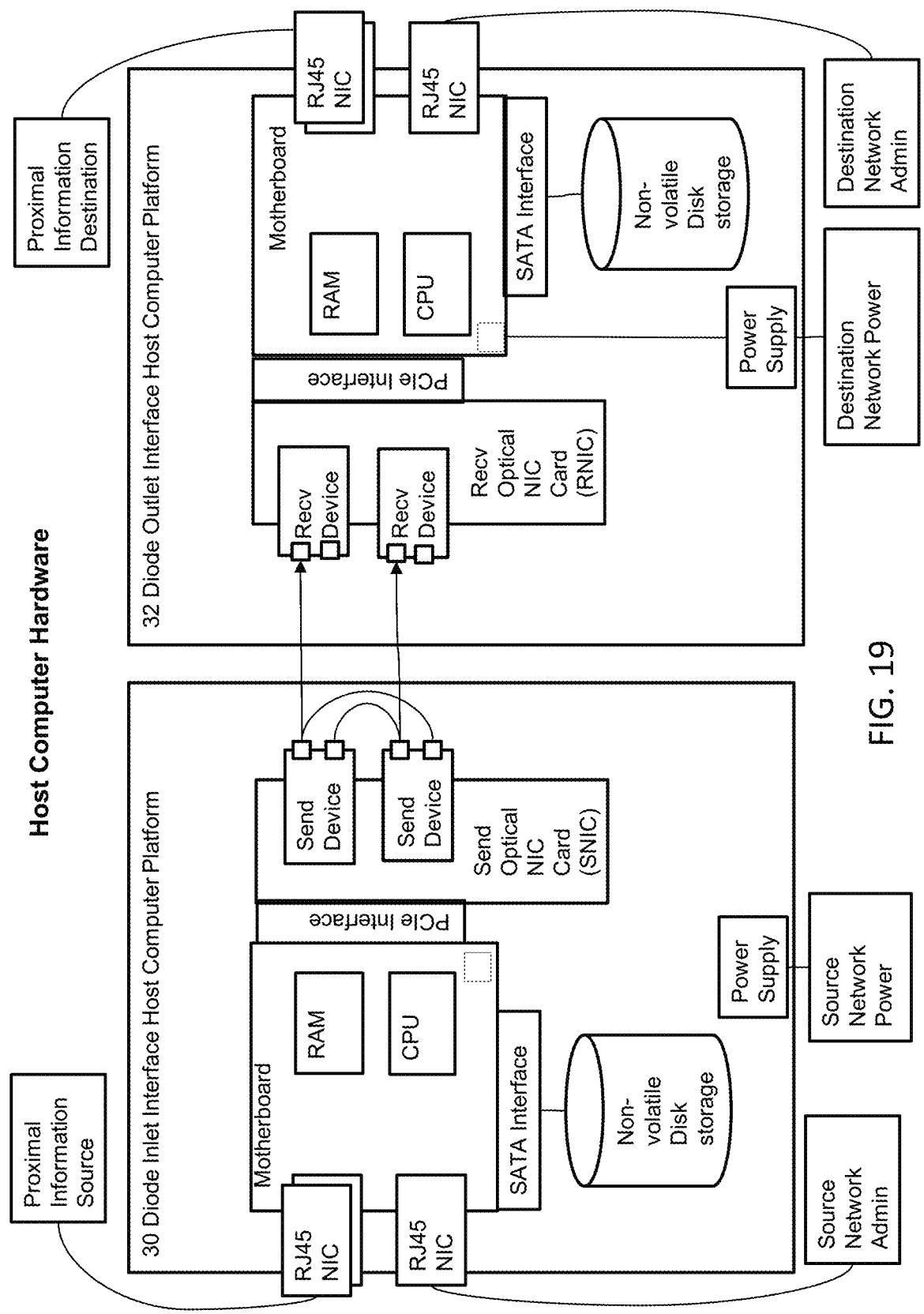

FIG. 19 illustrates an example embodiment of host computer platform hardware, e.g., inlet host computer platform 30 and outlet host computer platform 32, with respective NICs (SNIC for inlet host computer platform 30, and RNIC for outlet host computer platform 32).

Figure 20:
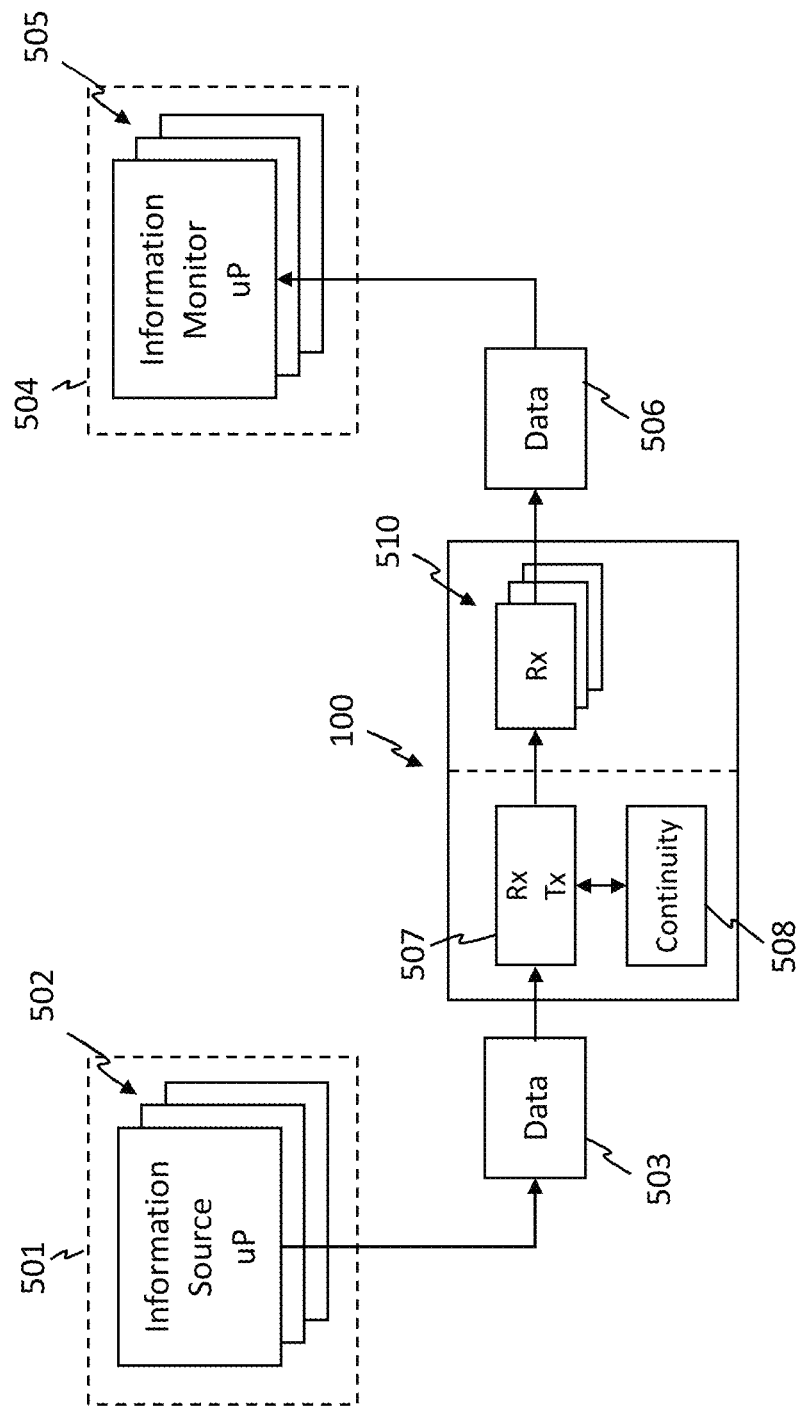
FIG. 20 illustrates a high-level overview of the invention according to the present disclosure.

FIG. 20 illustrates a high-level overview of a one-way information flow control system or a data communication system having a one-way information flow control device 100 according to the present disclosure. One or more information source(s) 502 is connected on a transmission side of the information flow control device 100, while one or more information monitor(s) 505 is connected on a receiving side of the information flow control device 100. The information sources 502 may be part of or originate from a secure facility or critical infrastructure 501, such as a nuclear power plant. The information sources may include sensors, monitoring devices, controllers, computers, machines, and/or the like which obtain and/or generate data 503 about the facility. In the context of a nuclear power plant, the information sources may include components of reactor vessels, pumps, and turbines and provide sensitive and/or non-sensitive data. The information monitors 505 may be part of another facility or infrastructure 504 that monitors data provided by the information sources (e.g., operating parameters of an information source machine or facility). In some instances, an information monitor may include a computing device, such as a desktop computer, laptop, tablet, mobile device, or the like, through which a user can view detailed information from the information sources. The information monitor may include the user acting on the data from the information sources. In some instances, the information monitor may be configured to analyze the incoming data 506 for alarm conditions and/or generate an output based on the data. As shown in FIG. 20, the one-way information flow control device has at least two transmit modules 507, 508 and at least one receive module 510. The transmit and receive modules may be provided in a single enclosure, or alternatively, they are in separate enclosures (as depicted by the dashed line). In some embodiments, the enclosures are tamper-resistant in order to prevent or reduce the likelihood of unauthorized reconfiguration of the one-way information flow control device.

The configurations and techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles

What is claimed is:

1. A one-way information flow control device, comprising:
    a first network interface card on a transmission side, the first network interface card including a first transceiver and a second transceiver, each of the first and second transceivers having a transmit port and a receive port;
    a second network interface card on a receiving side, the second network interface card including at least one receive port;
    a first data connection segment connecting the first transceiver transmit port to the second transceiver receive port;
    a second data connection segment connecting the second transceiver transmit port to the first transceiver receive port; and
    a third data connection segment connecting the first transceiver transmit port to the receive port of the second network interface card;
    whereby interconnection of the first and second transceivers provides continuity while connection of the first transceiver transmit port and the receive port of the second network interface card enables one-way data transfer.

2. The one-way information flow control device according to claim 1, wherein the control device is configured to provide only one-way data flow from the first network interface card to the second network interface card without any backward flow of information.

3. The one-way information flow control device according to claim 1, wherein the control device is configured to provide only one-way data flow from the first network interface card to the second network interface card without use of a routable communication protocol.

4. The one-way information flow control device according to claim 1, wherein the control device is configured to provide only one-way data flow from the first network interface card to the second network interface card while maintaining electronic isolation.

5. The one-way information flow control device according to claim 1, wherein the control device is configured to provide only one-way data flow from the first network interface card to the second network interface card while establishing link-layer connectivity between sending and receiving network devices.

6. The one-way information flow control device according to claim 1, wherein the control device is configured to provide only one-way data flow from the first network interface card to the second network interface card, wherein the third data connection segment connecting the first transceiver transmit port to the receive port of the second network interface card is split further to carry the same information to additional, receiving network interface cards using broadcast MAC address or duplicate MAC receiver addresses in order to provide redundant, parallel data transfer paths.

7. The one-way information flow control device according to claim 1, wherein the third data connection segment is a wireless connection.

8. The one-way information flow control device according to claim 1, wherein the third data connection segment includes a cable.

9. The one-way information flow control device according to claim 1, including a fourth data connection segment between the second transceiver transmit port and the second network interface card.

10. The one-way information flow control device according to claim 1, further comprising:
    a third network interface card on the receiving side, the third network interface card including at least one receive port; and
    a fourth data connection segment connecting the second transceiver transmit port to the receive port of the third network interface card.

11. The one-way information flow control device according to claim 9, wherein each transceiver is associated with a processor for optimizing performance of the information flow control device.

12. The one-way information flow control device according to claim 11, wherein one or more externally-facing network interface devices are associated with each processor for optimizing performance of the information flow control device.

13. The one-way information flow control device according to claim 1, wherein the first, second, and third data connection segments establish an indication of network connectivity among the first transceiver, the second transceiver, and the receive port of the second network interface card without modifying device electronics, rewiring interface contacts of the device electronics, or modifying electronics of either network interface card.

14. The one-way information flow control device according to claim 9, wherein removal, disconnection, or breakage of either the third or fourth data connection segment connecting the first network interface card to the second network interface card does not stop data transfer through the other data connection segment connecting the first network interface card to the second network interface card.

15. The one-way information flow control device according to claim 10, wherein removal, disconnection, or breakage of the third data connection segment connecting the first network interface card to the second network interface card does not stop data transfer through the fourth data connection segment connecting the first network interface card to the third network interface card, and vice versa.

16. A one-way information flow control device, comprising:
    at least three network interface cards, each having a transceiver with a transmit port and a receive port;
    a first data connection segment connecting the first transceiver transmit port to the second transceiver receive port;
    a second data connection segment connecting the second transceiver transmit port to the first transceiver receive port; and
    a third data connection segment connecting the first transceiver transmit port to the third transceiver receive port;
    whereby interconnection of the first and second transceivers provides continuity while connection of the first transceiver transmit port and the third transceiver receive port enables one-way data transfer.

17. The one-way information flow control device according to claim 16, wherein the first, second, and third data connection segments comprise wires.

18. The one-way information flow control device according to claim 17, wherein:
the first and third data connection segments form two portions of a split wire which has a proximal end and at least two distal ends;
the proximal end is connected to the first transceiver transmit port;
one of the distal ends is connected to the second transceiver receive port; and
another of the distal ends is connected to the third transceiver receive port.

19. The one-way information flow control device according to claim 18, wherein:
the split wire is an optical fiber; and
at least the first and third network interface cards are optical network interface cards.

20. The one-way information flow control device according to claim 18, wherein the split wire is an Ethernet cable having an Ethernet splitter.

21. The one-way information flow control device according to claim 16, wherein the third transceiver transmit port is disabled.

22. The one-way information flow control device according to claim 16, further comprising:
a fourth network interface card, which has a transceiver with a receive port; and
a fourth data connection segment connecting the second transceiver transmit port to the fourth transceiver receive port;
whereby connection of the second transceiver transmit port and the fourth transceiver receive port enables one-way data transfer equivalent to that made by the third data connection segment.

23. The one-way information flow control device according to claim 16, further comprising:
a fourth network interface card, which has a transceiver with a receive port; and
a fourth data connection segment connecting the first transceiver transmit port to the fourth transceiver receive port;
whereby connection of the first transceiver transmit port and the fourth transceiver receive port enables one-way data transfer equivalent to that made by the third data connection segment.

24. A data communication system which reports continuity but only permits one-way transmission, comprising:
an information source at a first location;
an information monitor at a second location;
a sensitive data; and
a hardware device for securely transmitting said sensitive data from said information source to said information monitor, said hardware device including:
a transmit module having first and second transceivers in which the transmit and receive ports are interconnected to provide an indication of continuity, and
at least one receive module having a receive port placed in data communication with the transmit port of one of the transceivers of the transmit module to receive the sensitive data in a hardware-enforced one-way transmission.

25. The data communication system of claim 24, wherein said information source is a secure facility.

26. The data communication system of claim 24, wherein said information source generates secure data to be transmitted via the hardware-enforced one-way transmission.

27. The data communication system of claim 24, wherein said information monitor analyzes said sensitive data for alarm conditions.

28. The data communication system of claim 24, wherein said information monitor generates an output based on the sensitive data.

29. The data communication system of claim 24, wherein the transmit and receive modules of said hardware device are provided in a single enclosure.

30. The data communication system of claim 24, wherein the transmit and receive modules of said hardware device are provided in separate enclosures.

31. The data communication system of claim 30, wherein the enclosures are tamper-resistant.

32. The data communication system of claim 30, wherein the enclosures are connected by a physical cable over which said sensitive data is transmitted.

33. The data communication system of claim 24, wherein said first and second transceivers are interconnected by physical cables.

34. The data communication system of claim 24, wherein said first and second transceivers are interconnected such that the receive port of each transceiver is connected to the transmit port of the other.

35. The data communication system of claim 24, wherein said information source includes a computer.

36. The data communication system of claim 35, wherein said computer of said information source monitors operating parameters of a machine or facility.

37. The data communication system of claim 35, wherein said computer of said information source is sued to encode said sensitive data.

38. The data communication system of claim 24, wherein said information monitor includes a computer.

39. The data communication system of claim 38 wherein said computer of said information monitor decodes said sensitive data.

40. The data communication system of claim 24, wherein said information monitor includes a person acting on said sensitive data.

41. The data communication system of claim 24, including two receive modules each connected to one of the transmit ports in the transmit module.

42. The data communication system of claim 41, wherein said two receive modules are connected to different transmit ports.

43. The data communication system of claim 24, including three receive modules, the first receive module connected to the first transceiver transmit port, the second receive module connected to the second transceiver transmit port, and the third receive module connected to either the first transceiver transmit port or the second transceiver transmit port.

44. The data communication system of claim 24, wherein said information monitor is a secure facility.

45. The data communication system of claim 24, wherein said information monitor receives secure data via the hardware-enforced one-way transmission.

46. The data communication system of claim 24, wherein said information source analyzes said sensitive data for appropriate conditions for transmission and for alarm conditions including presence of malware.

* * * * *